US012284303B2

(12) United States Patent
Liu et al.

(10) Patent No.: US 12,284,303 B2
(45) Date of Patent: Apr. 22, 2025

(54) BATTERY MODULE, FLEXIBLE DISPLAY APPARATUS, AND MOBILE TERMINAL

(71) Applicants: Chengdu BOE Optoelectronics Technology Co., Ltd., Chengdu (CN); BOE TECHNOLOGY GROUP CO., LTD., Beijing (CN)

(72) Inventors: Xiaolin Liu, Beijing (CN); Hong Zhu, Beijing (CN); Yue Cui, Beijing (CN); Yuehan Wei, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 627 days.

(21) Appl. No.: 17/630,612

(22) PCT Filed: Apr. 23, 2021

(86) PCT No.: PCT/CN2021/089429
§ 371 (c)(1),
(2) Date: Jan. 27, 2022

(87) PCT Pub. No.: WO2021/213515
PCT Pub. Date: Oct. 28, 2021

(65) Prior Publication Data
US 2022/0256020 A1    Aug. 11, 2022

(30) Foreign Application Priority Data
Apr. 24, 2020    (CN) .......................... 202010333084.6

(51) Int. Cl.
*H04M 1/02*    (2006.01)
*G09F 9/30*    (2006.01)
(Continued)

(52) U.S. Cl.
CPC .......... *H04M 1/0262* (2013.01); *G09F 9/301* (2013.01); *H01M 50/209* (2021.01);
(Continued)

(58) Field of Classification Search
CPC ...... G06F 1/1652; G06F 1/163; G06F 1/1635; G06F 1/1641; G09F 9/301; H04M 1/0268; H04M 1/0262
See application file for complete search history.

(56) References Cited

U.S. PATENT DOCUMENTS 9,510,470 B2    11/2016    Huitema et al.
9,980,402 B2    5/2018    Huitema et al.
(Continued)

FOREIGN PATENT DOCUMENTS

CN    102694136 A    9/2012
CN    105959435 A    9/2016
(Continued)

OTHER PUBLICATIONS

International Search Report and Written Opinion for International Application No. PCT/CN2021/089429 mailed Jul. 30, 2021.
First Office Action for CN Patent Application No. 202010333084.6 mailed Mar. 2, 2022.

*Primary Examiner* — Nam T Huynh
(74) *Attorney, Agent, or Firm* — Perilla Knox & Hildebrandt LLP; Kenneth A. Knox

(57) ABSTRACT

A battery module, a flexible display apparatus, and a mobile terminal are described. A battery module includes energy storage cells disposed along a first direction, a flexible connecting portion connected between adjacent energy storage cells for transmitting electric energy, and support housings corresponding to the energy storage cells in a one-to-one correspondence, a support housing being provided with an accommodation cavity that fits an energy storage cell. The first side of the support housing is provided with an
(Continued)

opening, a width of the support housing in the first direction is gradually decreased from the second side to the first side, the second side is opposite to the first side. The battery module further includes a support spacer with preset flexibility, where the support housings are disposed on one side of the support spacer along the first direction, and connecting members with preset flexibility connected between adjacent supporting housings.

14 Claims, 14 Drawing Sheets

(51) Int. Cl.
*H01M 50/209* (2021.01)
*H01M 50/247* (2021.01)
*H01M 50/289* (2021.01)
*H01M 50/502* (2021.01)

(52) U.S. Cl.
CPC ....... *H01M 50/247* (2021.01); *H01M 50/289* (2021.01); *H01M 50/502* (2021.01); *H04M 1/0268* (2013.01); *H01M 2220/30* (2013.01)

(56) References Cited

U.S. PATENT DOCUMENTS

| | | | |
|---|---|---|---|
| 2014/0363702 | A1 | 12/2014 | Kim |
| 2016/0014919 | A1 | 11/2016 | Huitema et al. |
| 2017/0172002 | A1 | 6/2017 | Huitema et al. |

FOREIGN PATENT DOCUMENTS

| | | | | |
|---|---|---|---|---|
| CN | 205566405 | U | 9/2016 | |
| CN | 106030688 | A | 10/2016 | |
| CN | 108076169 | A | 5/2018 | |
| CN | 208014279 | U | 10/2018 | |
| CN | 110557476 | A | 12/2019 | |
| CN | 111509158 | A | 8/2020 | |
| EP | 3087560 | A1 | 11/2016 | |
| EP | 3087560 | B1 | 2/2021 | |
| KR | 20140142978 | A | 12/2014 | |
| KR | 102041590 | B1 | 11/2019 | |
| WO | 2015100404 | A1 | 7/2015 | |
| WO | WO-2016083850 | A2 * | 6/2016 | ............. G06F 1/163 |
| WO | 2019196532 | A1 | 10/2019 | |

* cited by examiner

BATTERY MODULE, FLEXIBLE DISPLAY APPARATUS, AND MOBILE TERMINAL

CROSS-REFERENCE TO RELATED APPLICATIONS

This present disclosure is a national phase application under 35 U.S.C. § 371 of International Application No. PCT/CN2021/089429, filed on Apr. 23, 2021, which claims the benefit of and priority to Chinese Patent Application No. 202010333084.6, titled "BATTERY MODULE, FLEXIBLE DISPLAY APPARATUS, AND MOBILE TERMINAL," filed on Apr. 24, 2020, the contents of both of which being incorporated by reference in their entireties herein.

TECHNICAL FIELD

The present disclosure relates to the field of display technology and, in particular, to a battery module, a flexible display apparatus, and a mobile terminal.

BACKGROUND

Organic Light-Emitting Diodes (OLED) have self-luminous characteristics, as well as wide viewing angles, high contrast, and low energy consumption. Based on the characteristics of the OLED, the OLED is fabricated on a flexible substrate, and then a thin film encapsulation layer is fabricated on the OLED to block water and oxygen, which can realize the production of flexible display panels. The OLED flexible display panel reduces the use of backlights, and can reduce the thickness of the display panel while reducing the weight of the display apparatus.

As the market demand for flexible displays increases, more and more attention has been paid to the research and development of various flexible display apparatuses, the flexibility of the flexible display module broadens the use of terminal equipment, and can realize the folding, bending, and curling of terminal equipment. However, the rigid battery used in the existing terminal equipment limits the movement form of the terminal equipment using the flexible display module to a certain extent.

It should be noted that the information disclosed in the background section above is only used to enhance the understanding of the background of the present disclosure, and therefore may include information that does not constitute the prior art known to those of ordinary skill in the art.

SUMMARY

According to one aspect of the present disclosure, a battery module is provided, the battery module includes a plurality of energy storage cells disposed along a first direction, and a flexible connecting portion connected between adjacent energy storage cells for transmitting electric energy;

the battery module further includes a plurality of support housings corresponding to the plurality of energy storage cells in a one-to-one correspondence, wherein a support housing is provided with an accommodation cavity that fits an energy storage cell; the support housing is provided with a first side and a second side which are opposite to each other, the first side of the support housing is provided with an opening, a width of the support housing in the first direction H1 is gradually decreased from the second side to the first side;

the battery module further includes a support spacer with preset flexibility, wherein the plurality of support housings are disposed on one side of the support spacer along the first direction;

connecting members with preset flexibility connected between adjacent supporting housings.

According to an embodiment of the present disclosure, the support housing includes a bottom plate, a first side plate, a second side plate, a third side plate and a fourth side plate; the first side plate and the second side plate are oppositely disposed on two sides of the bottom plate, the third side plate and the fourth side plate are oppositely disposed on the other two sides of the bottom plate, the first side plate, the second side plate, the third side plate and the fourth side plate are enclosed to form the accommodation cavity and the opening opposite to the bottom plate; the second side of the third side plate and the second side of the fourth side plate are detachably connected with a cover plate adapted to the opening.

According to an embodiment of the present disclosure, the battery module further includes a first end and a second end opposite to each other in the first direction, wherein a case is connected to a free end of the support housing at the first end opposite to an adjacent support housing, and an inside of the case is provided with an accommodating space.

According to an embodiment of the present disclosure, the battery module further includes traction sheets which are provided and are configured to pass through the third side plates and the fourth side plates of the plurality of supporting housings from the first end to the second end of the battery module sequentially and respectively;

A second end of the traction sheets is fixed and is fixedly connected with the supporting housing located at the second end of the battery module, a first end of the traction sheets is configured to penetrate through a first side wall of the case and is connected with a limit end.

According to an embodiment of the present disclosure, the limit end is magnetic, the first side wall of the case and a second side wall of the case opposite to the first side wall are respectively provided with metal limit piece corresponding to the limit end.

According to an embodiment of the present disclosure, an outside of the battery module is provided with a flexible wrapping layer.

According to an embodiment of the present disclosure, fillers with preset elasticity and flexibility are filled in gaps between adjacent support housings.

According to one aspect of the present disclosure, a flexible display apparatus is provided, including:
 a flexible display module; and
 a battery module described above, where the flexible display module is attached to a surface of the battery module on a second side for at least supplying power to the flexible display module;
 a bending direction of the flexible display module is a first direction.

According to one aspect of the present disclosure, a flexible display apparatus is provided, including: a flexible display module, an elastic spacer and a battery module that are sequentially stacked;
 the battery module includes a flexible composite layer connected to the elastic spacer and a plurality of energy storage cells connected to a side of the flexible composite layer away from the elastic spacer;
 the energy storage cells are arranged in sequence along a first direction, and there is a gap between two adjacent energy storage cells; the plurality of energy storage cells are configured to supply power to the flexible display module through the flexible composite layer.

According to an embodiment of the present disclosure, the flexible display apparatus further includes a plurality of side baffles;

the side baffles are disposed on both ends of the energy storage cells and fixed at the elastic spacer; an orthographic projection of a side baffle on a plane perpendicular to a length direction of the energy storage cells is a trapezoid; a size of an end of the side baffle close to the flexible display module in the first direction is larger than a size of an end close to the energy storage cell in the first direction.

According to an embodiment of the present disclosure, there is a gap between two adjacent side baffles when the flexible display apparatus is in a flattened state.

According to an embodiment of the present disclosure, the front housing further includes end covers which are disposed at two ends of the front housing and are connected with the elastic spacer;

the end cover includes two end cover baffles disposed opposite to each other, and an end cover connecting plate connecting the two end cover baffles; an accommodating space is formed between the two end cover baffles disposed opposite to each other, and the energy storage cell located at an end of the flexible display apparatus is accommodated in the accommodating space;

there is a gap between an end cover baffle and an adjacent side baffle when the flexible display apparatus is in a flattened state.

According to an embodiment of the present disclosure, the flexible display apparatus further includes a motherboard; the front housing further includes a motherboard housing; and the motherboard housing is configured to fix the motherboard;

the motherboard housing is connected with the elastic spacer; there is a gap between the motherboard housing and an adjacent side baffle when the flexible display apparatus is in a flattened state.

According to an embodiment of the present disclosure, two adjacent side baffles are hinged with each other.

According to an embodiment of the present disclosure, two ends of a side baffle along the first direction are respectively provided with an inside notch and an outside notch; at a position where the inside notch is provided, the side baffle is provided with an outer side wall; at a position where the outside notch is provided, the side baffle is provided with an inner side wall; the inner side wall is provided with a first hinge hole, and the outer side wall is provided with a second hinge hole;

in the two adjacent side baffles, a portion of the inner side wall of one first side baffle is configured to extend into the inside notch of the other side baffle to align one first hinge hole and one second hinge hole;

the front housing further includes a pin which is inserted into the aligned first hinge hole and the second hinge hole to hinge the two adjacent side baffles.

According to an embodiment of the present disclosure, the front housing further includes a damping ring; one end of the pin is provided with an external thread;

one of the first hinge hole and the second hinge hole is provided with an internal thread, and the damping ring is disposed in the other one of the first hinge hole and the second hinge hole;

the pin is passed through and disposed in the damping ring, and is connected by the external thread and the internal thread.

According to an embodiment of the present disclosure, on an outer side of the inner side wall or an inner side of the outer side wall, the side baffle is provided with a damping layer; when the two adjacent side baffles are rotated relative to each other, the damping layer is capable of exerting a damping effect on a rotation between the inner side wall and the outer side wall cooperated with each other.

According to an embodiment of the present disclosure, a thickness of a portion of the damping layer close to an edge of the side baffle is gradually decreased along the direction close to the edge of the side baffle.

According to an embodiment of the present disclosure, the front housing further includes a baffle connecting plate; and the two side baffles located at both ends of the energy storage cell are connected by the baffle connecting plate, and the baffle connecting plate is located at a side of the energy storage cell away from the elastic spacer.

According to an embodiment of the present disclosure, the front housing further includes an end cover located at an end of the flexible display apparatus, and the end cover is hinged with an adjacent side baffle;

the end cover includes two end cover baffles disposed opposite to each other, and an end cover connecting plate connecting the two end cover baffles;

an accommodating space is formed between the two end cover baffles and the end cover connecting plate, the energy storage cell located at the end of the flexible display apparatus is accommodated in the accommodating space.

According to an embodiment of the present disclosure, the flexible display apparatus further includes a motherboard; the front housing further includes a motherboard housing; and the motherboard housing is configured to fix the motherboard;

the motherboard housing is connected with the elastic spacer; the motherboard housing is hinged with and the adjacent side baffles.

According to an embodiment of the present disclosure, the side baffle is provided with a lightening hole.

According to an embodiment of the present disclosure, an end of the side baffle close to the flexible display module is provided with a first bearing surface, and the first bearing surface is configured to carry and fix the elastic spacer.

According to an embodiment of the present disclosure, the flexible display apparatus further includes a flexible light-transmitting cover plate, the flexible light-transmitting cover plate is disposed at a side of the flexible display module away from the elastic spacer;

the side baffle is further provided with a second bearing surface, the second bearing surface is located at a side of the first bearing surface away from the elastic spacer; wherein the second bearing surface is configured to carry and fix the flexible light-transmitting cover plate.

According to an embodiment of the present disclosure, the flexible display apparatus further includes a motherboard and a front housing;

wherein the front housing includes a first region, a second region and a third region arranged in sequence along the first direction; the energy storage cells are disposed in the first region and the third region; the motherboard is disposed in the second region.

According to an embodiment of the present disclosure, the flexible display apparatus further includes a flexible circuit board;

the energy storage cells located in the first region and the third region are connected to the motherboard through a same flexible circuit board; or the energy storage cells located in the first region are connected to the motherboard through a flexible circuit board, and the energy storage cells located in the third region are connected to the motherboard through another flexible circuit board.

According to one aspect of the present disclosure, a mobile terminal is provided which includes the flexible display apparatus described above.

It should be understood that the above general description and the following detailed description are only exemplary and explanatory, and cannot limit the present disclosure.

BRIEF DESCRIPTION OF THE DRAWINGS

The accompanying drawings herein are incorporated into the specification and form a part of the present specification. The embodiments conforming to the present disclosure are shown and used to explain the principles of the present disclosure in conjunction with the specification. Understandably, the accompanying drawings described below are only some embodiments of the present disclosure, and other drawings can be obtained from these accompanying drawings without any creative effort for those skilled in the art.

DETAILED DESCRIPTION

Figure 1:
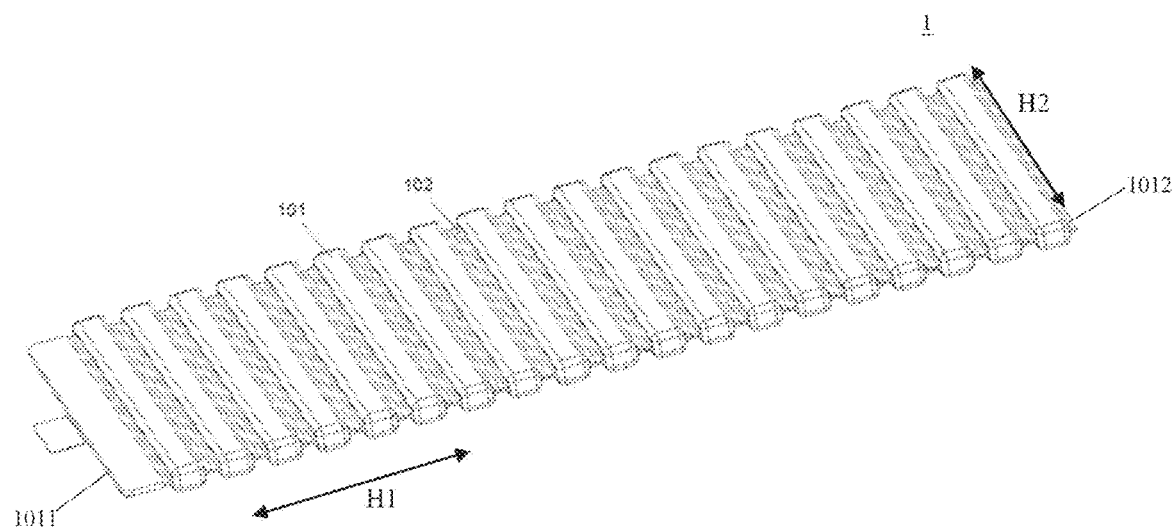
FIG. 1 is a schematic structural diagram of a battery module provided by embodiments of the present disclosure.

Now, exemplary embodiments will be described more comprehensive with reference to the accompanying drawings. However, exemplary embodiments can be implemented via various manners, and should not be understood as being limited to the embodiments set forth herein. Conversely, these embodiments are provided so that the present disclosure will be comprehensive and complete, and the concept of the exemplary embodiments will be comprehensively communicated to those skilled in the art. The same reference numeral in the accompanying drawings denote the same or similar structure(s), thereby detailed description thereof will be omitted. Furthermore, the accompanying drawings are only exemplary illustrate of the present disclosure and are not necessarily to scale.

Although relative terms such as "upper" and "lower" are used in this specification to describe the relative relationship between one component of a reference numeral and another component, these terms are used in this specification only for convenience, for example, according to the exemplary direction described in the accompanying drawings. It should be understood that if the device of a reference numeral is flipped upside down, the component described "upper" will become the component "lower". When a component is "on" the other component, it may refer to that the component is formed on the other component, or that the component is "directly" disposed on the other component, or that the component is "indirectly" disposed on the other component via another component.

The terms "one", "a/an", "this", "the", and "at least one" are used to denote the existence of one or more elements/components/etc. The terms "including" and "having" are used to denote the meaning of open inclusion and refer to the existence of additional element/component/etc. In addition to the listed element/component/etc. The terms "first", "second", and "third" are used only as tags, and not as a limitation on the number of objects.

First Embodiment

Referring to FIGS. 1 to 6, the first embodiment of the present disclosure provides a battery module 1, where the battery module 1 includes a plurality of energy storage cells 101 disposed along a first direction H1. A flexible connecting portion 102 is connected between two adjacent energy storage cells 101 for transmitting electric energy.

In other words, the battery module 1 includes a plurality of energy storage cells 101, and the energy storage cells 101 are the rigid energy storage parts of the battery module 1. The plurality of energy storage cells 101 are arranged at intervals along the first direction H1, and two adjacent energy storage cells 101 are connected by a flexible connecting portion 102. Not only can the flexible connecting portion 102 provide flexible connection functionality, but the flexible connecting portion 102 also can realize the electric energy transmission between adjacent energy storage cells 101. Through the arrangement of the battery module 1 including a plurality of energy storage cells 101 and connected by the flexible connecting portion 102, the folding, bending, and curling operations of the battery module 1 in the first direction H1 can be realized, so that the battery module 1 has a bendable function. Correspondingly, in the present disclosure, the first direction H1 may be the bending direction of the flexible display module, so that the battery module 1 can be adapted to the flexible display module to meet the needs of multiple use forms of display equipment or terminal electronic equipment that apply flexible displays, and can realize the wearable function of the display equipment or terminal electronic equipment.

In the present disclosure, the energy storage cells 101 are used to store electrical energy, and are a rigid non-bendable part of the battery module 1, and the number can be set according to the electrical energy capacity required by the battery module 1. Alternatively, the dimensions of the plurality of energy storage cells 101 are equal. In some embodiments, referring to FIG. 1, the energy storage cell 101 may be a cell which is configured as a long strip and has a rectangular cross-sectional shape. The first direction H1 is the width direction of the energy storage cell 101 having a long strip shape, the length direction of the energy storage cell 101 is the second direction H2, and the second direction H2 is perpendicular to the first direction H1. It is understandable that the cross section of the energy storage cell 101 perpendicular to its length direction may also have other shapes, such as a trapezoid, a rectangle with chamfered corners, and the like.

The parameters, such as the number and width of the energy storage cells 101 can affect the range of the bendable angle of the battery module 1 under the condition that the electric energy stored by the energy storage cells 101 is sufficient, the width of the energy storage cell 101 can be appropriately reduced, and the number of the energy storage cells 101 can be increased to increase the bending angle of the battery module 1 and reduce the curling radius of the battery module 1, thus the bending performance of the battery module 1 is improved.

The flexible connecting portion 102 is used to connect adjacent energy storage cells 101. The flexible connecting portion 102 can transmit electric energy between the energy storage cells 101 and, by using its flexibility, a bending operation can be performed between adjacent energy storage cells 101, and the large-area bendability of the battery module 1 can be realized. The width (dimension in the first direction H1) of the flexible connecting portion 102 can be set according to the bending range of the battery module 1, the installation area range of the battery module 1, and the power capacity requirements of the battery module 1, and the length (dimension in the second direction H2) thereof may be equal to or smaller than the length of the energy storage cell 101, as long as it does not affect its power transmission function.

In some embodiments, a plurality of flexible connecting portions 102 may be connected to each other to form a flexible composite layer. In other words, the battery module 1 may include a flexible composite layer extending along the first direction H1 and a plurality of energy storage cells 101, each energy storage cell 101 is arranged along the first direction H1 and connected to the flexible composite layer in sequence; there is a gap between two adjacent energy storage cells 101. In this way, the part of the flexible composite layer located between the energy storage cells 101 can be bent, so that the battery module 1 can be bent.

In an embodiment of the present disclosure, the flexible composite layer may include a flexible positive pole conductive lead and a flexible negative pole conductive lead extending along the first direction H1, the energy storage cell 101 is provided with a positive pole tab and a negative pole tab, the positive electrode tab of each energy storage cell 101 is electrically connected to the flexible positive pole conductive lead, and the negative electrode tab of each energy storage cell 101 is electrically connected to the flexible negative pole conductive lead.

Further, the battery module 1 may also be provided with an output port for providing electrical energy to the flexible display panel and the terminal provided by the present disclosure. The output port can be connected to the flexible connecting portion 102, for example, can be connected to the flexible composite layer and connected to the flexible positive pole conductive lead and the flexible negative pole conductive lead.

In an embodiment of the present disclosure, the output port may be an integral structure with the flexible composite layer, and its end is provided with a bonding pad for outputting electrical energy.

In another embodiment of the present disclosure, the battery module may be provided with a flexible circuit board, and the flexible circuit board is connected to the flexible connecting portion; the output end of the flexible circuit board can be used as the output port of the battery module.

The present disclosure provides a battery module 1, the battery module 1 is arranged to include a plurality of energy storage cells 101, and adjacent energy storage cells 101 are connected by the flexible connecting portion 102, therefore, through the arrangement of the battery module 1, on the one hand, the energy storage cells 101 can meet the energy storage requirements of the battery module 1, and the flexible connecting portions 102 can transmit the electric energy between the energy storage cells 101 to ensure the function of the battery module 1; on the other hand, operations such as folding, bending, and curling of the battery module 1 in the first direction H1 can be realized, so that the battery module 1 has a bendable function, and the battery module 1 can be adapted to a flexible display module and adapted to the flexible display module to meet the needs of multiple use forms of display equipment or terminal electronic equipment that apply flexible displays, and can realize the wearable function of the display equipment or terminal electronic equipment.

In some embodiments of the present disclosure, referring to FIGS. 2 to 5, the battery module 1 also includes a plurality of support housings 103 corresponding to each of the energy storage cells 101, the inside of the support housing 103 is provided with an accommodation cavity that fits the energy storage cell 101. The support housing 103 is provided with a first side 1131 and a second side 1132, the first side 1131 of the support housing 103 is provided with an opening, the second side 1132 is closer to the flexible display module than the first side 1131, the width of the support housing 103 in the first direction H1 gradually decreases from the second side 1132 close to the flexible display module to the first side.

In order to improve the protection effect of the energy storage cell 101 and prolong its service life, in a technical solution provided in the present disclosure, the battery module 1 further includes a plurality of support housings 103 that fit the energy storage cells 101 one by one. The support housing 103 is provided with an accommodation cavity fit the energy storage cell 101, and the first side 1131 of the support housing 103 is provided with an opening, the energy storage cell 101 can be placed in the accommodation cavity in the middle of the corresponding support housing 103 through the opening on the first side 1131. The support housing 103 is a rigid housing, which can be made of stainless steel or aluminum alloy, and can protect the energy storage cell 101.

In an embodiment of the present disclosure, the spacing between adjacent support housing 103 should be same, and the size of the spacing can be set according to the width of the flexible connecting portion 102 in the first direction H1. It should be ensured that neither stretch nor wrinkles are caused to the flexible connecting portions 102, so as to protect the flexible connecting portions 102 while maintaining good bending performance of the battery module 1.

Figure 5:
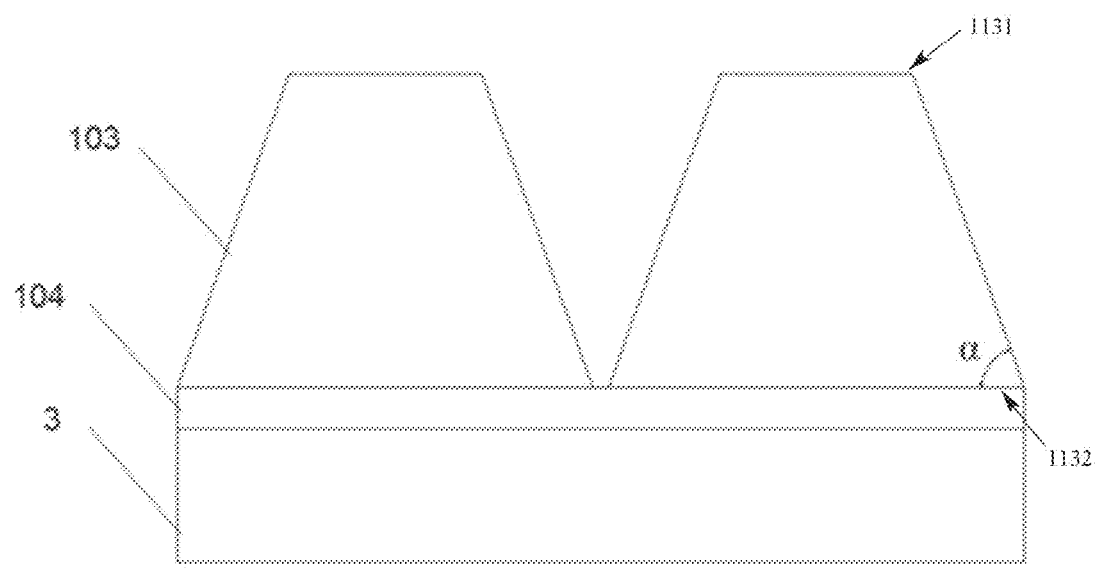
FIG. 5 is a schematic diagram of a cross-sectional shape of a support housing of a battery module provided by embodiments of the present disclosure.
Figure 6:
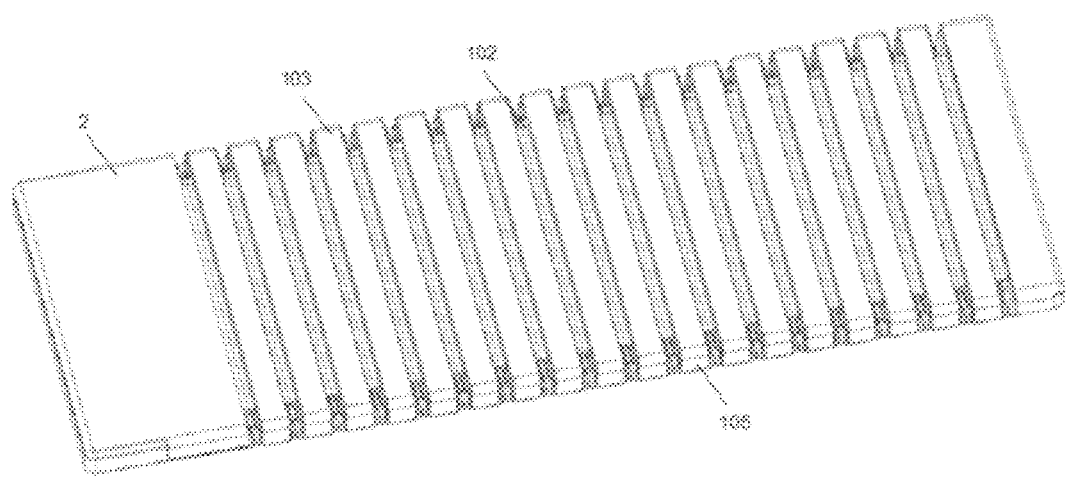
FIG. 6 is a schematic structural diagram of a combination of a support housing and a cover of a battery module provided by embodiments of the present disclosure.

In an embodiment of the present disclosure, in order to facilitate the bending of the battery module 1, increase the range of the bending angle of the battery module 1, and adapt to the bendable and non-stretchable nature of the flexible display module, as shown in FIG. 5, the support housing 103 can be arranged as: the width in the first direction H1 may be set to gradually decrease from the second side 1132 to the first side 1131, and the second side 1132 may be the side where the flexible display module is connected. That is, the cross-sectional shape of the support housing 103 may be a trapezoid, which can provide a bending space for the adjacent support housing 103 to increase the range of the bending angle of the battery module 1. Referring to FIG. 5, the inclination angle α of the oblique side of the trapezoid can be set according to the number of supporting housings 103, the bending requirement angles of the battery module 1 and the equipment to which the battery module 1 is applied; the second side 1132 of the support housing 103 may be the side where the flexible display module is disposed, the second sides 1132 of the adjacent support housings 103 can be separated by a small gap, when the supporting housing 3 is bent toward the second side 1132 together with the flexible display module, due to the above-mentioned configuration of the cross-sectional shape of the supporting housing 3, the first sides of the supporting housings 103 are close to each other and the distance between them has readily apparent dimensional change, and there is no significant dimensional change on the distance between second sides of the adjacent supporting housings 103, which can avoid stretching the flexible display module, and can protect the flexible display module.

Figure 4:
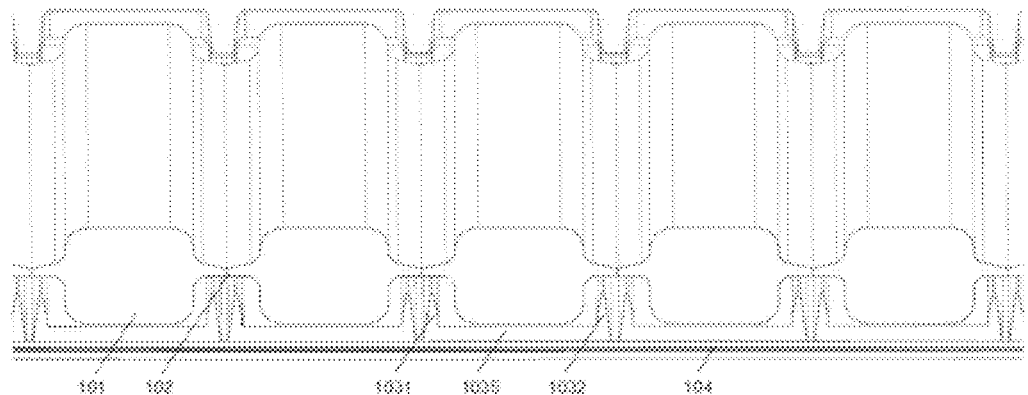
FIG. 4 is a schematic diagram of the cross-sectional structure of FIG. 3.

Referring to FIGS. 4 and 5, in an embodiment of the present disclosure, the battery module 1 further includes: a support spacer 104 with preset flexibility, and a plurality of the support housings 103 are disposed on one side of the support spacer 104 along the first direction H1.

Specifically, in order to further protect the energy storage cells 101 and the flexible connecting portions 102 and maintain the bending performance of the battery module 1, in the technical solution adopted in the present disclosure, a support spacer 104 with preset flexibility is also provided, a plurality of support housings 103 may be disposed on one side of the support spacer 104 along the first direction H1, for example, the fixed connection between the support housings 103 and the support spacer 104 can be realized by means of bonding, spot welding or locking with small screws. Through the arrangement of the flexible support spacer 104, the adjacent support housings 103 do not need to be connected to each other, and only need to maintain an equal and appropriate distance. The other side of the support spacer 104 can be connected with the flexible display module, during the bending process, the support spacer 104 are deformed by bending or curling, which can reduce the stress on the flexible connecting portions 102 between the adjacent energy storage cells 101, in this way, the flexible connecting portion 102 can be protected.

Further, in specific implementations, connecting members with preset flexibility are connected between the adjacent supporting housings 103.

Specifically, in order to protect the energy storage cells 101 and the flexible connecting portions 102 and maintain the bending performance of the battery module 1, in addition to providing the above-mentioned support spacer 104, in the technical solution adopted in the present disclosure, the adjacent support housings 103 can also be connected by connecting members with preset flexibility, a connecting member is disposed between the adjacent support housings 103 and closer to the second side 1132, so that the energy storage unit 101 is placed in the support housing, so as to make the energy storage cell 101 be placed in the support housing, the flexible connecting portion 102 is closer to the first side 1131 than the connecting member, due to the configuration of the shape of the support housing 103, the width of the flexible connecting portion 102 may be slightly wider than the width of the connecting member, so as to ensure the smoothness of the battery module 1 to be bent.

Figure 2:
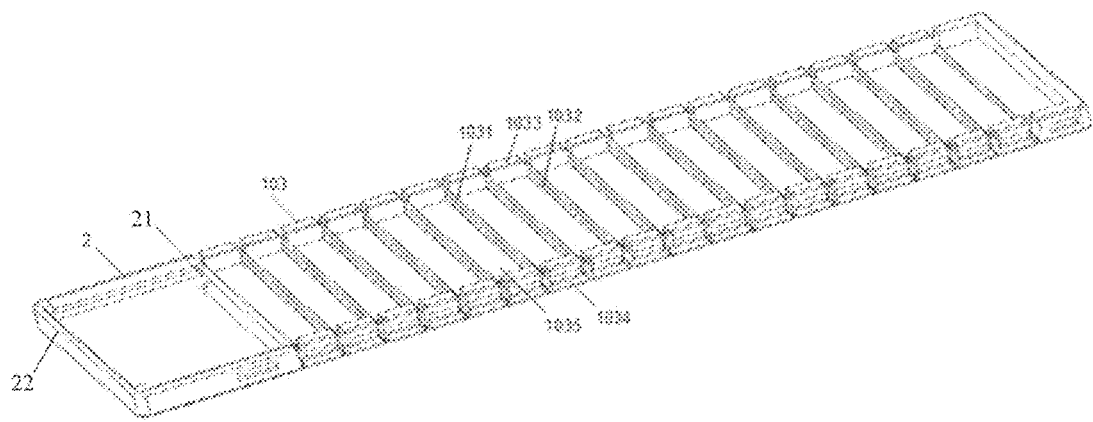
FIG. 2 is a schematic structural diagram of a support housing of a battery module provided by embodiments of the present disclosure.

In an embodiment of the present disclosure, referring to FIGS. 2 and 4, the support housing 103 includes a bottom plate 1035, a first side plate 1031, a second side plate 1032, a third side plate 1033, and a fourth side plate 1034. The first side plate 1031 and the second side plate 1032 are oppositely arranged on two sides of the bottom plate 1035, the third side plate 1033 and the fourth side plate 1034 are oppositely disposed on the other two sides of the bottom plate 1035, the first side plate 1031, the second side plate 1032, the third side plate 1033 and the fourth side plate 1034 are enclosed to form the accommodation cavity and the opening opposite to the bottom plate 1035. The second sides 1132 of the third side plate 1033 and the fourth side plate 1034 are detachably connected with a cover plate 105 adapted to the opening.

Specifically, in the technical solution adopted in the present disclosure, the specific structure of the support housing 103 may include a bottom plate 1035, a first side plate 1031, a second side plate 1032, a third side plate 1033 and a fourth side plate 1034, the first side plate 1031 and the second side plate 1032 are oppositely disposed on two sides of the bottom plate 1035, and the third side plate 1033 and the fourth side plate 1034 are oppositely disposed on the other two sides of the bottom plate 1035, that is, the first side plate 1031, the second side plate 1032, the third side plate 1033 and the fourth side plate 1034 are enclosed on the first side 1131 of the bottom plate 1035 to form an accommodation cavity and an opening on the first side 1131. The first side plate 1031 and the second side plate 1032 may be disposed opposite to each other in the first direction H1, in order to facilitate the arrangement of the flexible connecting portions 102 between adjacent energy storage cells 101, as shown in FIGS. 2 and 4, the heights of the first side plate 1031 and the second side plate 1032 in the direction from the second side 1132 to the first side 1131 may be smaller than the heights of the third side plate 1033 and the fourth side plate 1034, the heights of the first side plate 1031 and the second side plate 1032 can be set according to the installation position of the flexible connecting portion 102 relative to the energy storage cell 101, exemplary, after the energy storage cell 101 is placed in the accommodation cavity of the support housing 103, the flexible connecting portion 102 can just overlap the first side plate 1031 and the second side plate 1032; the heights of the fourth side plate 1034 and the third side plate 1033 can be set according to the thickness of the energy storage cell 101, and the second sides 1132 of the fourth side plate 1034 and the third side plate 1033 are detachably connected with a cover plate 105 for cover the opening, therefore, the energy storage cell 101 can be fixed in the accommodation cavity of the support housing 103, so as to avoid the problem of the energy storage cell 101 coming out of the support housing or drilling holes during the bending process of the battery module 1.

Specifically, grooves may be provided at the ends of the second sides 1132 of the third side plate 1033 and the fourth side plate 1034, and buckle structures are provided on the cover plate 105 at the position corresponding to the grooves, so as to realize the fixation of the cover plate 105 with the third side plate 1033 and the fourth side plate 1034, and press on the energy storage cell 101 to limit the position of the energy storage cell 101, however, the manner of fixing the cover plate 105 to the third side plate 1033 and the fourth side plate 1034 is not limited to this.

Further, referring to FIG. 2, in specific implementations, the battery module 1 includes a first end 1101 and a second end 1102 opposite to each other in the first direction H1, a case 2 is connected to the free end of the support housing 103 at the first end 1101 opposite to the adjacent support housing 103, and the inside of the case 2 is provided with an accommodating space.

Specifically, in the technical solution adopted in the present disclosure, the battery module 1 includes a first end 1101 and a second end 1102 oppositely disposed in the first direction H1, a case 2 is connected to the free end of the support housing 103 at the first end 1101 opposite to the adjacent support housing 103, and the case 2 has an accommodating space inside. The length of the case 2 can be equal to the length of the energy storage cell 101, and is a rigid and inflexible case 2, which can be made of carbon fiber composite materials; the case 2 can be an inflexible part of a display equipment or an electronic terminal equipment to which the battery module 1 is applied, and can be provided with control components such as processing chips and functional components such as cameras, earpieces, and sensors, the battery module 1 can be electrically connected with components inside the case 2 to supply power to the components inside the case 2. For specific arrangement, see FIGS. 2 and 6, the case 2 may include a detachably connected first case body and a second case body, the first case body is connected to the support housing 103 at the first end 1101.

Figure 3:
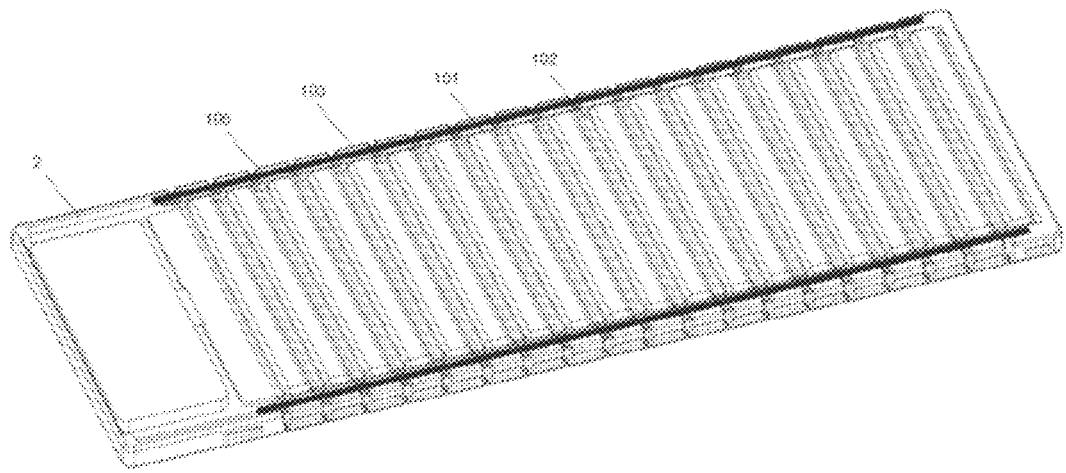
FIG. 3 is a schematic structural diagram of another battery module provided by embodiments of the present disclosure.

Further, referring to FIG. 3, in specific implementations, the battery module 1 further includes traction sheets 106 which are provided and are configured to pass through the third side plates 1033 and the fourth side plates 1034 of the plurality of support housings 103 from the first end 1101 to the second end 1102 of the battery module 1 sequentially and respectively. The second end of the traction sheet 106 is fixed, and is fixedly connected with the support housing 103 located at the second end 1101, the case 2 includes a first side wall 21 and a second side wall 22 which are opposite to each other, and the first side wall 21 is closer to the battery module 1 in the first direction H1, the first end (i.e., the end located at the first end of 1101 of the battery module 1) of the traction sheet 106 penetrates through the first side wall 21 of the case 2 and is connected with a limit end.

Specifically, in order to realize the unidirectional bending of the battery module 1, in the technical solution adopted in the present disclosure, a traction sheet 106 is sequentially passed through the third side plates 1033 of the plurality of support housings 103 disposed from the first end 1101 to the second end 1102, and another traction sheet 106 is also passed through the fourth side plates 1034 of the plurality of support housings 103, the two traction sheets 106 are elongated structures with smaller widths, the second end of the traction sheet 106 is fixedly connected with the support housing 103 located at the second end 1102 of the battery module 1, and the first end of the traction sheet 106 penetrates the first side wall 21 of the case 2, the first side wall 21 is the side wall close to the support housing 103, and the first end of the traction sheet 106 is provided with a limit end (not shown in the figure), which is used to maintain the flattened state of the battery module 1 and limit the bending of the battery module 1 to the second side 1132, so that the battery module 1 can only be bent to the first side 1131, which can be adapted to the unidirectional bending property of the flexible display module and avoid damage to the flexible display module caused by reverse bending. In FIG. 3, only the extending direction and the positions of both ends of the traction sheets 106 are shown, in the specific arrangement, the traction sheets 106 on both sides are respectively passed through the middle of the third side plate 1033 or the fourth side plate 1034, for details, please refer to FIG. 2, a through hole for passing the traction sheet 106 is provided in the middle of each third side plate 1033 or the fourth side plate 1034.

Further, in specific implementations, the limit end is magnetic, the first side wall 21 of the case 2 and the second side wall 22 opposite to the first side wall 21 are respectively provided with metal limit pieces corresponding to the limit end.

Specifically, in order to realize the positioning of the battery module 1 in the flattened state and the curled state, and to realize the wearable properties of the flexible equipment to which the battery module 1 is applied, in the technical solution adopted in the present disclosure, the limit end is magnetic and can be made of magnet material, and the first side wall 21 and the second side wall 22 of the case 2 are respectively provided with metal limit pieces, when the battery module 1 is in a flattened state, the limit end is attracted and fixed with the metal limit piece on the first side wall 21, which can maintain the flattened state of the battery module 1 and can limit the battery module 1 reverse bending; when the battery module 1 is bent, the first end of the traction sheet 106 moves toward the second side wall 22 of the case 2, when the support housing 103 at the second end 1102 is in contact with the second side end surface of the case 2, the second side end surface is an outer end surface of the second side wall 22, the limit end located at the first end of the traction sheet 106 reaches the second side wall 22 of the housing 2 and is attracted and fixed with the metal limit piece on the second side wall 22, which can maintain the curled state of the battery module 1 and realize the wearable properties of the flexible equipment to which the battery module 1 is applied, the large-area curl can adapt to the curved surface of the human wrist and arm, which is in line with ergonomic requirements and is comfortable to wear.

Further, in specific implementations, the outside of the battery module 1 is provided with a flexible wrapping layer, alternatively, fillers with preset elasticity and flexibility may also be filled in the gaps between the adjacent support housings 10.

Specifically, when the battery module 1 is in a flattened state, there are gaps between the adjacent support housings 103, in order to prevent dust or other foreign objects from entering the gaps, in the technical solution adopted in the present disclosure, a flexible wrapping layer can be provided outside the battery module 1 to isolate the battery module 1 from the external structure and prevent the entry of dust, and ensure the normal operation and use of the battery module 1. Alternatively, fillers may also be arranged between the adjacent support housings 103 to fill the gaps between the adjacent support housings 103, in order to avoid the influence of the fillers on the bending performance of the battery module 1, a material with certain elasticity and flexibility should be selected to make the filler so that it can be well compressed when the battery module 1 is bent, and after the battery module 1 is unfolded and restored to its original shape, the fillers can reliably fill the gaps between the support housings 103.

Second Embodiment

Figure 7:
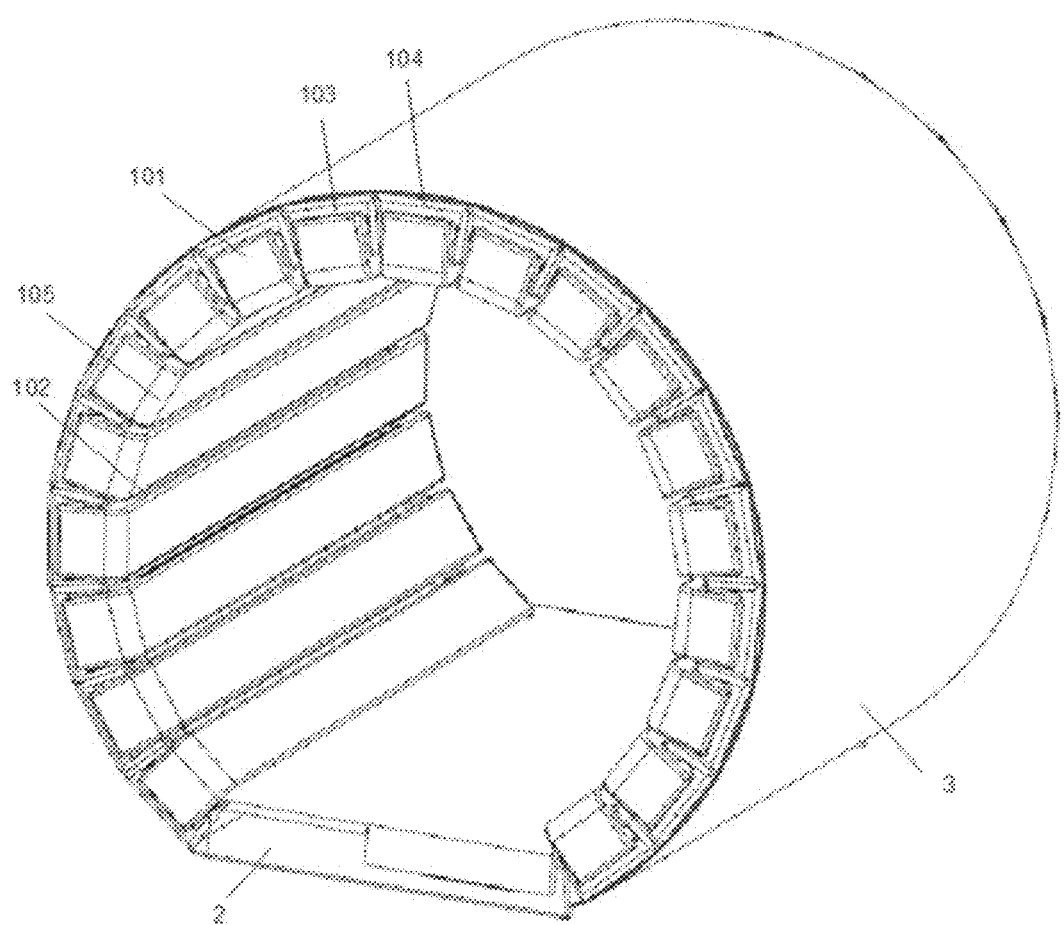
FIG. 7 is a schematic structural diagram of a flexible display apparatus provided by embodiments of the present disclosure.

As shown in FIG. 7, the second embodiment of the present disclosure provides a flexible display apparatus, and the flexible display apparatus includes:

A flexible display module 3 and the battery module 1 described above, the flexible display module 3 is attached to a surface on the second side 1132 of the battery module 1 for at least supplying power to the flexible display module 3. The bending direction of the flexible display module 3 is the first direction H1.

Specifically, the flexible display apparatus may be an independent equipment for realizing a display function, or may be a display module or a touch display module of a mobile terminal, for example, it can be a display part of a mobile phone, a tablet computer, a smart watch or a smart bracelet, etc.; the flexible display module 3 can be an OLED flexible display screen (Organic Light-Emitting Diodes), or can also be a flexible liquid crystal display, a flexible electronic paper display, etc., the specific type is not limited, and can be a touch screen or a non-touch screen; the battery module 1 is used to supply power to the flexible display apparatus, including supplying power to the flexible display module 3, the flexible display module 3 is disposed on one side surface of the battery module 1, and the flexible display module 3 can be bent along the first direction H1 by virtue of its flexibility; the battery module 1 includes a plurality of energy storage cells 101 arranged along the first direction H1 and flexible connecting portions 102 connecting adjacent energy storage cells 101, so that the battery module 1 and the flexible display module 3 can be bent, folded, and curled together, in addition, the large area can be bent, which can increase the practicability of the flexible display apparatus, and can realize the use of curling, thereby realizing the wearable properties of the flexible display apparatus and enhancing its portability.

Specifically, when arranging the flexible display module 3, referring to FIG. 4, when the battery module 1 uses the support spacer 104 to connect a plurality of support housings 103, the plurality of support housings 103 are disposed on one side of the support spacer 104 along the first direction H1, the flexible display module 3 can be disposed on the other side of the support spacer 104, and the wider side of the support housing 103 with a trapezoidal cross-sectional shape is arranged on the side close to the flexible display module 3, which can facilitate the bending of the flexible display apparatus, and can avoid stretching the flexible display module 3 when it is bent toward the first side 1131, and can protect the flexible display module 3; further, the arrangement of the traction sheets 106 of the battery module 1 can limit the bending of the flexible display apparatus only toward the first side 1131, and can avoid damage to the flexible display module caused by reverse bending.

Based on the above, the embodiments of the present disclosure provide a flexible display apparatus, the battery module 1 is used to supply power to the flexible display apparatus, and the flexible display module 3 is disposed on one side surface of the battery module 1, the flexible display module 3 can be bent along the first direction H1 by virtue of its flexibility, the battery module 1 includes a plurality of energy storage cells 101 arranged along the first direction H1 and flexible connecting portions 102 connecting adjacent energy storage cells 101. It can be realized that the battery module 1 and the flexible display module 3 can be bent, folded, and curled together.

Third Embodiment

Figure 8:
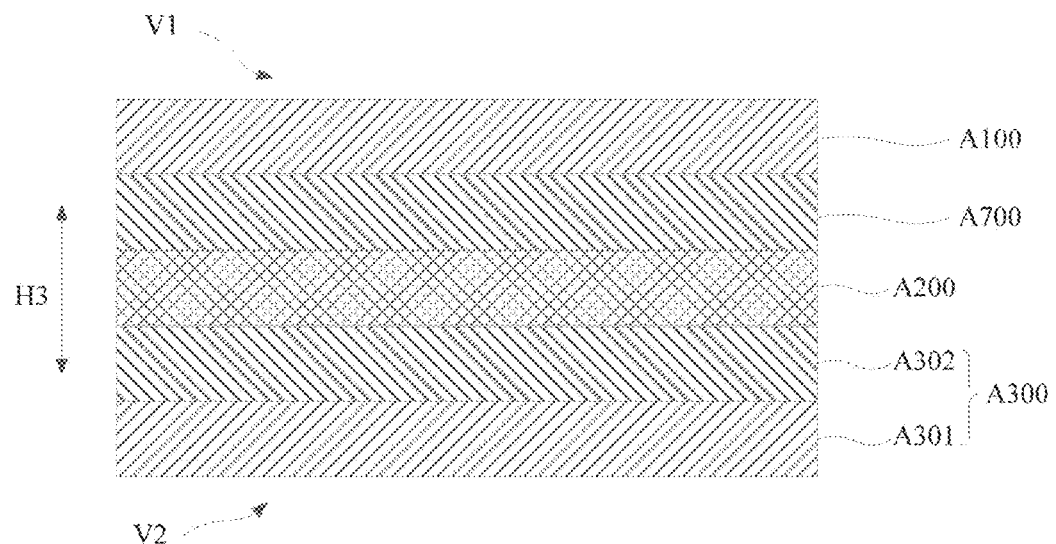
FIG. 8 is a layered view of a partial structure of a flexible display apparatus in an embodiment of the present disclosure.

The present disclosure provides a flexible display apparatus and a mobile terminal applying the flexible display apparatus. Referring to FIG. 8, the flexible display apparatus includes a flexible display module A100, an elastic spacer A200 and a battery module A300 that are sequentially stacked along a third direction H3. The battery module A300 includes a flexible composite layer A302 connected to the elastic spacer A200 and a plurality of energy storage cells A301 connected to the side of the flexible composite layer A302 away from the elastic spacer A200 (see FIG. 8), the energy storage cells A301 are arranged in sequence along the first direction H1, and there is a gap between two adjacent energy storage cells A301. Each energy storage cell of the battery module A300 can supply power to the flexible display module A100 through the flexible composite layer A302.

Figure 10:
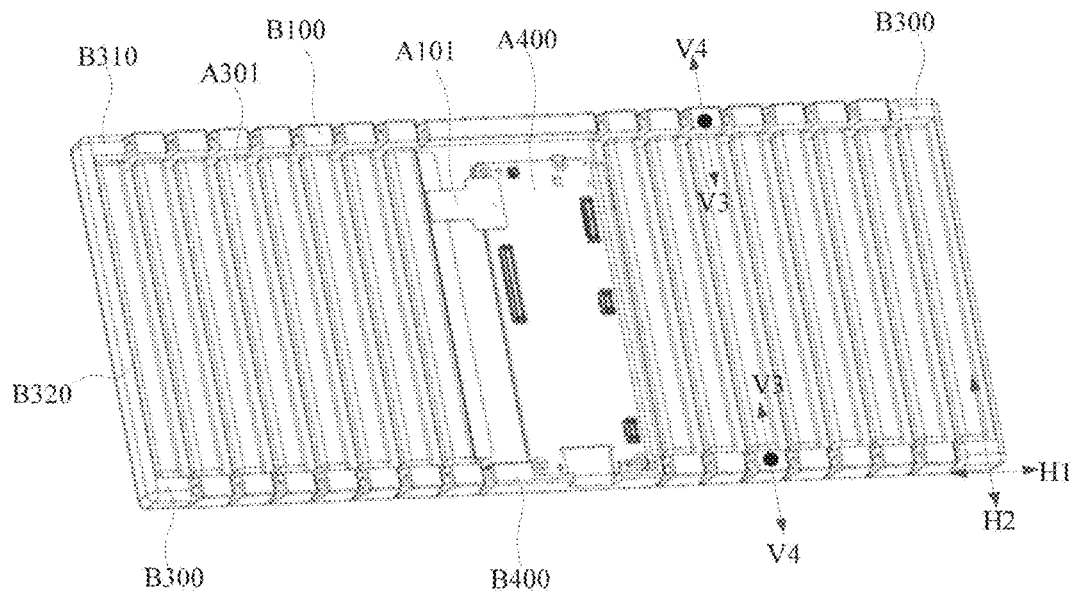
FIG. 10 is a schematic structural diagram of the back side of the flexible display apparatus in a flattened state in an embodiment of the present disclosure; the rear housing is not shown.

In the present disclosure, referring to FIG. 10, the direction in which the plurality of energy storage cells A301 are arranged in sequence is the first direction H1, the first direction H1 is also a direction in which the flexible display apparatus can be bent. The length direction of the energy storage cell A301 is the second direction H2, and the first direction H1 and the second direction H2 are perpendicular to each other. The stacking direction of the flexible display module A100, the elastic spacer A200 and the battery module A300 is the third direction H3, the third direction H3 is perpendicular to the first direction H1 and the second direction H2. Referring to FIG. 8, in the present disclosure, the flexible display module A100 can emit light toward the side away from the elastic spacer A200 for display, therefore, the side of the flexible display apparatus where the flexible display module A100 is disposed can be used as the front side V1 of the flexible display apparatus, and the side where the battery module A300 is disposed can be used as the back side V2 of the flexible display apparatus. Referring to FIG. 10, in the embodiments of the present disclosure, along the second direction H2, the direction away from the energy storage cells A301 may be defined as the outer side V4 of the flexible display apparatus, and the direction toward the energy storage cells A301 is defined as the inner side V3 of the flexible display apparatus.

In the flexible display apparatus provided by the present disclosure, the elastic spacer A200 has high elasticity, while the flexible display module A100 and the flexible composite layer A302 have good flexibility but lack sufficient elasticity, this makes the flexible display apparatus bend around the elastic spacer A200 when it is bent, that is, the elastic spacer A200 is the neutral layer of the flexible display apparatus, which is neither stretched nor compressed. The flexible display module A100 and the flexible composite layer A302 are respectively fixed at both sides of the elastic spacer A200, and the two are arranged close to the elastic spacer A200, so that the two are also very close to the neutral layer of the flexible display apparatus when they are bent, so that the tension or compression they bear is very small. In this way, not only can the elastic spacer A200 carry the flexible display module A100 and the flexible composite layer A302, but also can provide protection for the flexible display module A100 and the flexible composite layer A302.

Not only that, since the elastic spacer A200 has a high elastic modulus, it has good flatness in the flattened state, and a smooth curved surface in the bent state. In this way, a flat or smooth supporting surface can be provided for the flexible display module A100, so that the flexible display module A100 can be in a flat state or a smoothly bent state as a whole, so as to prevent the flexible display module A100 from wrinkling and reducing the display effect.

In some embodiments, the material of the elastic spacer A200 may be a metal material with a higher elastic modulus, such as stainless steel, titanium alloy and the like.

In some embodiments, the flexible display apparatus may further be provided with a first adhesive layer A700 between the flexible display module A100 and the elastic spacer A200, so as to adhere the flexible display module A100 on the elastic spacer A200. Alternatively, the first adhesive layer A700 may be double sided adhesive tape, especially, may be double sided adhesive foam tape.

In some embodiments, the flexible display apparatus may further be provided with a second adhesive layer between the flexible composite layer A302 and the elastic spacer A200, so as to adhere the flexible composite layer A302 on the elastic spacer A200. Alternatively, the second adhesive layer may be double sided adhesive tape, especially, may be double sided adhesive foam tape.

Figure 9:
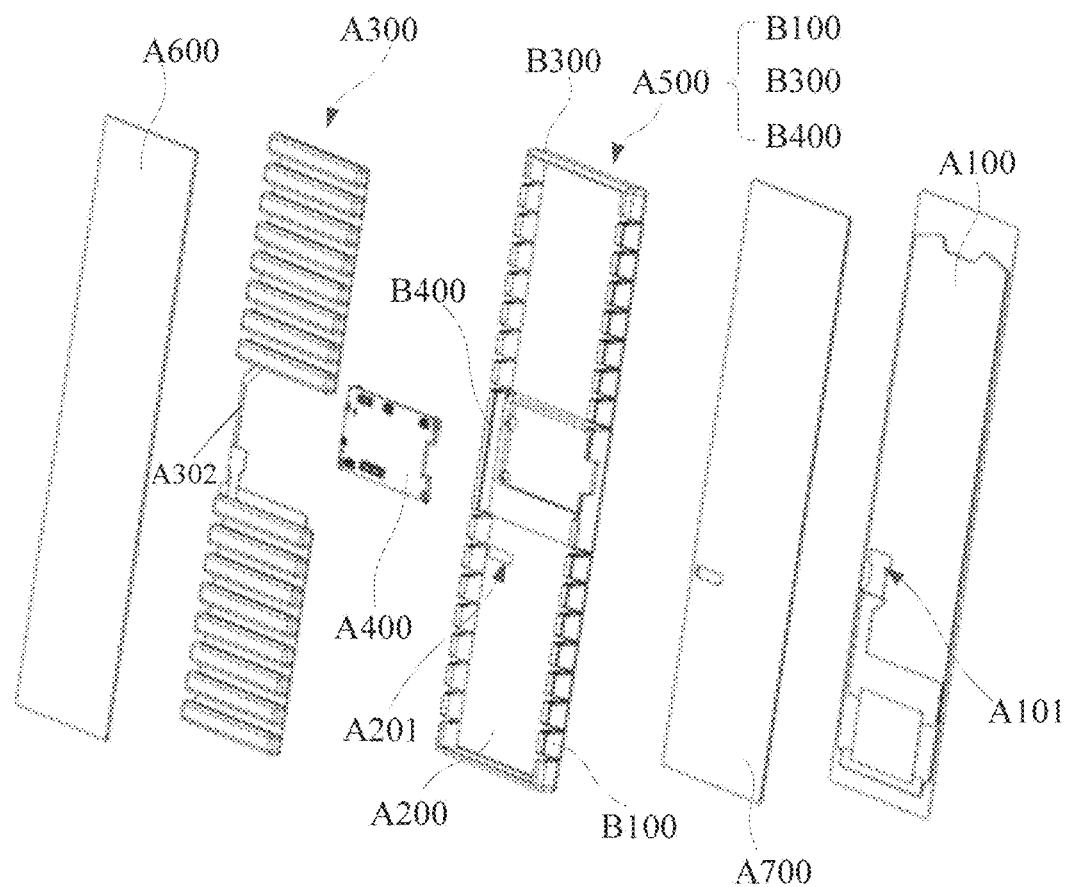
FIG. 9 is an exploded schematic diagram of a flexible display apparatus in an embodiment of the present disclosure.

In some embodiments, referring to FIG. 9, the flexible display apparatus of the present disclosure may further include a front housing A500, and the front housing A500 may include a plurality of side baffles B100. Referring to FIG. 10, the side baffles B100 are arranged on both ends of each of the energy storage cells A301 and fixed on the elastic spacer A200 (see also FIG. 11). Referring to FIG. 10, the orthographic projection of the side baffle B100 on a plane perpendicular to the second direction H2 is a trapezoid, and may especially be an isosceles trapezoid. The size of the end of the side baffle B100 close to the flexible display module A100 in the first direction H1 is larger than the size of the end close to the energy storage cell A301 in the first direction H1. In other words, one end of the side baffle B100 at the back side V2 of the flexible display apparatus has a smaller size in the first direction H1, one end at the front side V1 of the flexible display apparatus has a larger size in the first direction H1. In this way, the flexible display apparatus can be bent or curled toward the back side V2 under the constraint of the side baffles B100.

In one embodiment of the present disclosure, referring to FIG. 10, for the energy storage cells A301 that are not at the ends of the flexible display apparatus, the side baffles B100 are provided at both ends in the length direction. In this way, these energy storage cells A301 are protected by the side baffles B100. Further, the size of the energy storage cell A301 in the direction perpendicular to its length direction may be smaller than the size of the side baffle B100 in this direction. Thus, an accommodation cavity may be formed between the two side baffles B100 disposed opposite to each other, and the energy storage cell A301 may be completely accommodated in the accommodation cavity. In this way, the energy storage cell A301 can be sufficiently protected by the side baffles B100 at both ends.

Figure 12:
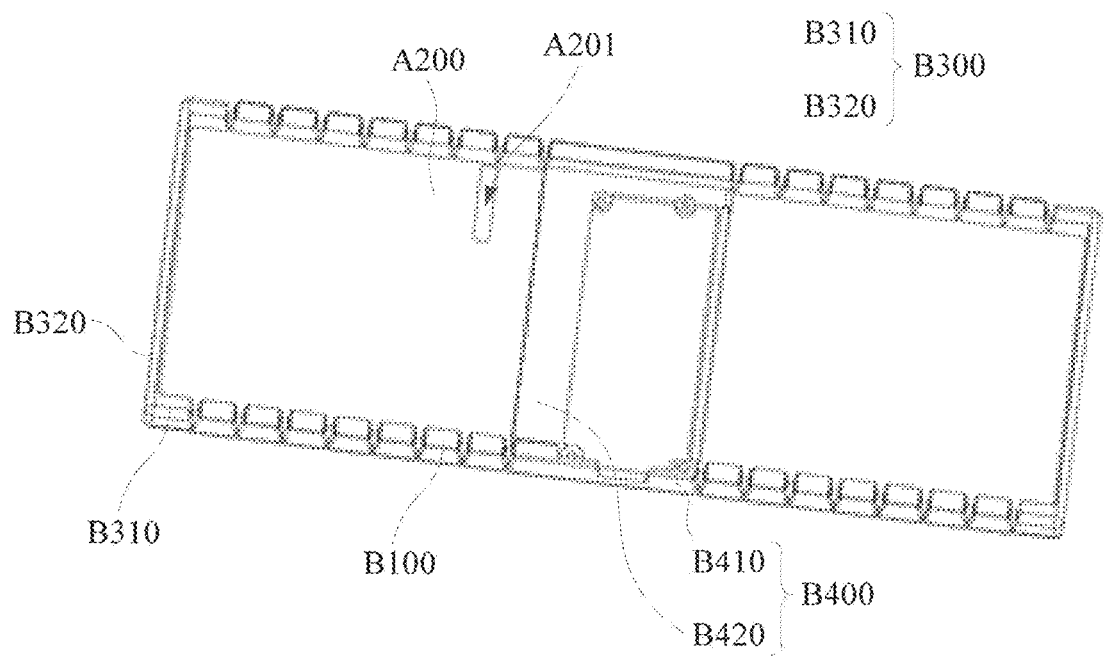
FIG. 12 is a schematic structural diagram showing the cooperation between the front housing and the elastic spacer in an embodiment of the present disclosure, and the schematic diagram showing the rear side.
Figure 13:
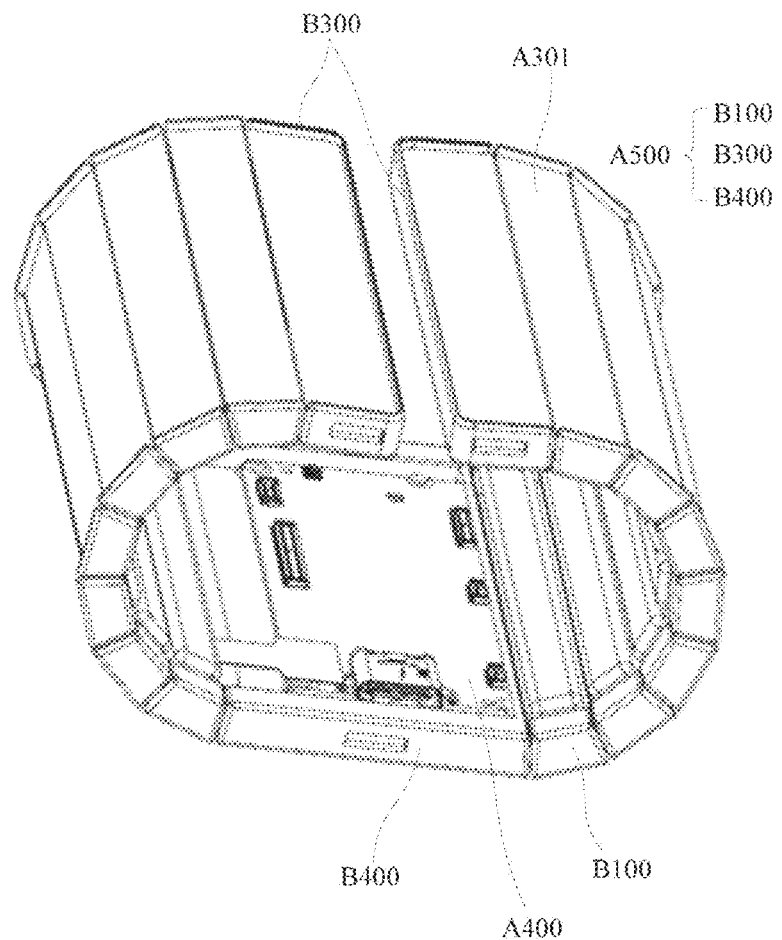
FIG. 13 is a schematic structural diagram of a flexible display panel in a bent state in an embodiment of the present disclosure, where, the flexible display module, the elastic spacer and the rear housing are not shown.

In an embodiment of the present disclosure, referring to FIGS. 10 and 12, in a flattened state, there is a gap with a preset size between the ends of the two adjacent side baffles B100 located on the front side V1, which can avoid mutual interference between the side baffles B100 and hinder the flexible display apparatus of bending. Referring to FIG. 13, during bending, when two adjacent side edges of the two adjacent side baffles B100 are abutted or contacted, the two adjacent side baffles B100 obstruct each other so that the flexible display apparatus stops bending at this position. In this way, the bending can be limited, and the flexible display module A100 or the flexible composite layer A302 can be prevented from being damaged due to excessive bending curvature. It can be understood that the bending curvature of the flexible display apparatus can be adjusted by reasonably setting the size of the side baffles B100 and the gap between the side baffles B100.

Figure 11:
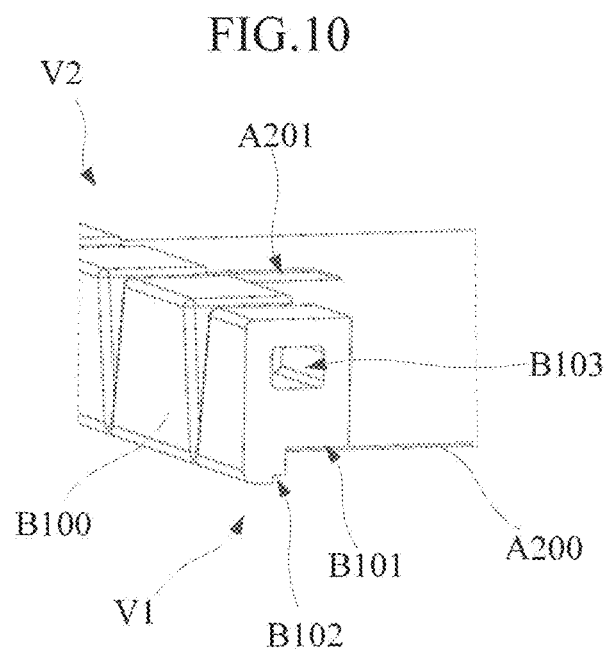
FIG. 11 is a schematic diagram showing the cooperation between the side baffle and the elastic spacer in an embodiment of the present disclosure.

In some embodiments, referring to FIG. 11, the side baffle B100 may be provided with a first bearing surface B101, the first bearing surface B101 faces the front side V1 of the flexible display apparatus, and extends inward along the inner side V3 direction to meet the inner side surface of the side baffle B100 to support the elastic spacer A200. In this way, the elastic spacer A200 can be in contact with the first bearing surface B101 and be connected to the side baffle B100 by bonding, welding, screw connection or other feasible connection methods.

In some embodiments, there are two edges at both ends of the side baffle B100 in the first direction H1, a part of the edge on the front side of the plane where the first bearing surface B101 is located can be either perpendicular to the first direction H1, or can be located on the same plane as other part of the edge, as long as the adjacent side baffles B100 do not hinder the bending of the flexible display apparatus to the back side.

Further, in the technical solution, referring to FIG. 11, the side baffle B100 is further provided with a second bearing surface B102. In the second direction H2, the second bearing surface B102 is located at the side of the first bearing surface B101 away from the energy storage cell A301; in the third direction H3, the second bearing surface B102 is located at the side of the first bearing surface B101 away from the energy storage cell A301. In this way, the first bearing surface B101 and the second bearing surface B102 make the side baffle B100 step-shaped on the front side V1 of the flexible display apparatus. The flexible display apparatus may further include a flexible light-transmitting cover plate, and the flexible light-transmitting cover plate may be disposed at the side of the flexible display module A100 away from the elastic spacer A200 to protect the flexible display module A100. The edge of the flexible light-transmitting cover plate can be supported on the second bearing surface B102 and connected to the side baffle B100 by means of bonding.

In an embodiment of the present disclosure, referring to FIG. 11, the side baffle B100 may be further provided with a lightening hole B103. Alternatively, the lightening hole B103 may be located at the side of the elastic spacer A200 at the back side V2, and penetrates through the side baffle B100 along the first direction H1. In this way, the weight of the side baffle B100 can be reduced, thereby reducing the weight of the flexible display apparatus and the mobile terminal, which is beneficial to the wearing and use of the mobile terminal.

Further, the flexible display apparatus may also be provided with elastic strips, and the elastic strips are configured to pass through the lightening holes B103 of the adjacent side baffles B100 and are in a stretched state. In this way, the contraction force of the elastic strip can be transmitted to the side baffles B100, so that the flexible display apparatus is bent to the back side, for example, the flexible display apparatus remains in a bent state. Alternatively, the lightening hole B103 is a rectangular hole with chamfered corners, so as to enhance the weight reduction capability of the lightening hole B103 as much as possible and avoid damage to the elastic strip.

In some embodiments, referring to FIG. 9, the front housing A500 may further include an end cover B300 at the end of the flexible display apparatus. Referring to FIG. 12, the end cover B300 includes two end cover baffles B310 disposed opposite to each other, and an end cover connecting plate B320 connecting the two end cover baffles B310. An accommodating space is formed between the two end cover baffles B310 disposed opposite to each other, and the energy storage cell A301 located at the end of the flexible display apparatus can be accommodated in the accommodating space.

In an embodiment of the present disclosure, referring to FIG. 12, the end cover baffle B310 may have a right-angled trapezoid shape. In the flattened state, the edges of the end cover baffle B310 at the front side V1 and the back side V2 of the flexible display apparatus are respectively parallel to the first direction H1, and its edge away from the adjacent side baffle B100 is perpendicular to the first direction H1; moreover, the end with smaller size of the end cover baffle B310 in the first direction H1 is located at the back side V2 of the flexible display apparatus. In this way, the flexible display apparatus can also be bent between the end cover B300 and the adjacent side baffles B100. Further, there is a gap between the end cover baffle B310 and the adjacent side baffle B100 to ensure that the elastic spacer can be bent between the two.

In some embodiments, the end cover baffle B310 may be provided with a third bearing surface for supporting the elastic spacer A200, and the elastic spacer A200 is carried on the third bearing surface and is fixedly connected to the end cover baffle B310. Further, when the flexible display apparatus is unfolded, the first bearing surface B101 and the third bearing surface are coplanar.

In some embodiments, the end cover baffle B310 may be provided with a fourth bearing surface for carrying the flexible light-transmitting cover plate, and the flexible light-transmitting cover plate is carried on the fourth bearing surface and fixedly connected to the end cover baffle B310. Further, when the flexible display apparatus is flatted, the second bearing surface B102 and the fourth bearing surface are coplanar.

In some embodiments, the size (height) of the end cover baffle B310 in the first direction H1 may be the same as the size (height) of the side baffle B100 in the first direction H1.

In some embodiments, the end cover connecting plate B320 is located on the side of the energy storage cell A301 disposed at the end that is away from other energy storage cells A301. Where, when the flexible display apparatus is flatted, the plane where the end cover connecting plate B320 is located may be perpendicular to the first direction H1, the extension direction of the end cover connecting plate B320 may be the same as the length direction of the energy storage cell A301. In this way, when the flexible display apparatus is bent into a ring shape, the two end cover connecting plates B320 at both ends of the flexible display apparatus can be aligned with each other and make surface-to-surface contact, so that the flexible display apparatus presents a complete closed-loop ring shape.

In an embodiment of the present disclosure, the two end cover connecting plates B320 disposed at both ends of the flexible display apparatus may be provided with connecting pieces that cooperate with each other, so that the two end cover connecting plates B320 can be connected to each other and the flexible display apparatus can maintain a closed-loop state. The connecting pieces cooperated with each other may be a connecting piece such as two magnetic pieces with opposite magnetism, hook-and-loop fasteners that cooperate with each other, snap-connecting components that cooperate with each other, whichever can realize a separable connection.

In some embodiments, the size (height) of the end cover connecting plate B320 in the first direction H1 may be the same as the size (height) of the end cover baffle B310 in the first direction H1.

In some embodiments, referring to FIG. 9, the flexible display apparatus further includes a motherboard A400. The front housing A500 may further include a motherboard housing B400, and the motherboard housing B400 is used to fix the motherboard A400. In the first direction H1, the energy storage cell A301 are distributed on both sides of the motherboard housing B400. In other words, referring to FIGS. 10 and 12, the energy storage cells A301 are divided into two groups. The energy storage cells A301 in each group are arranged in sequence along the first direction H1; the two groups of energy storage cells A301 are respectively located on both sides of the motherboard housing B400. Correspondingly, the side baffles B100 can also be divided into two groups corresponding to the two groups of energy storage cells A301, and each group of the side baffles B100 are arranged to fit with a corresponding group of energy storage cells A301. The number of the end covers B300 is two, and they are located on both sides of the motherboard housing B400 respectively. In each group of energy storage cells A301, the energy storage cell A301 farthest from the motherboard housing B400 is located in the end cover B300 on the same side.

In other words, the front housing A500 includes a first region, a second region and a third region arranged along the first direction; the energy storage cells are disposed in the first region and the third region; the motherboard is disposed in the second region. Where, the energy storage cells A301 located in the first region are a group of energy storage cells A301; the energy storage cells A301 located in the third region are another group of energy storage cells A301. The second region is used for disposing the motherboard housing B400, so that the motherboard is fixed to the second region.

Further, the two groups of energy storage cells A301 can be connected to the motherboard through the same flexible circuit board, or can be connected to the motherboard through the flexible circuit board respectively.

Exemplary, in an embodiment of the present disclosure, the energy storage cells located in the first region and the energy storage cells located in the third region are connected to the motherboard through the same flexible circuit board; thus all the energy storage cells A301 are connected to the motherboard through one flexible circuit board.

Exemplary, in another embodiment of the present disclosure, the energy storage cells located in the first region are connected to the motherboard through a same flexible circuit board, and the energy storage cells located in the third region are connected to the motherboard through another flexible circuit board.

In an embodiment of the present disclosure, the number of the energy storage cells A301 in each of the two groups of energy storage cells A301 is the same, so that the motherboard housing B400 may be located in the middle of the front housing A500. When the flexible display apparatus is bent into a closed ring shape, the motherboard housing B400 may be disposed opposite to the joint of the two end covers B300. According to the embodiment, a flexible display apparatus and a terminal may each include a rigid region that is not bendable, and include two bendable regions on both sides of the rigid region. The motherboard is located in the rigid region, and each energy storage cell is located in the bendable region.

In an embodiment of the present disclosure, the size of the motherboard housing B400 in the first direction H1 is larger than the size of the side baffle B100 in the first direction H1. Because the motherboard housing B400 is rigid and does not participate in bending, the flexible display apparatus can form a relatively flat display plane in the area of the motherboard housing B400 after bending, and form curved surfaces on both sides thereof. According to this arrangement, referring to FIG. 13, the position of the motherboard housing B400 corresponds to the back side of the human wrist; when the motherboard housing B400 is placed on the back of the human wrist, other components on both sides of the motherboard housing B400 can be bent toward the wrist to form an arc covering the wrist. So that the flexible display apparatus and mobile terminal of the present disclosure can be adapted to be worn on the wrist of a person by bending.

In some embodiments, referring to FIG. 12, the motherboard housing B400 includes side walls B410 of the motherboard housing B400 which are opposite to each other, and a motherboard housing connecting plate B420 connected to the side walls B410. In the flattened state of the flexible display apparatus, the plane on which the side wall B410 of the motherboard housing is located may be perpendicular to the second direction H2 and extend along the first direction H1. The side walls B410 of the motherboard housing and the motherboard housing connecting plate B420 may form an accommodating space, and the motherboard A400 may be completely accommodated in the accommodating space.

In some embodiments, as a whole, the side wall B410 of the motherboard housing may be in a trapezoidal structure. Where, the size of the end of the motherboard housing B400 away from the elastic spacer A200 is smaller than the end of the motherboard housing B400 close to the elastic spacer A200, so that the flexible display apparatus can also be bent between the motherboard housing B400 and the side baffle B100, thereby improving the bending performance of the flexible display apparatus. Further, when the flexible display apparatus is in a flattened state, there is a gap between the side wall of the motherboard housing and the adjacent side baffle, so as to ensure that the elastic spacer can be bent between the two.

In some embodiments, the plane on which the motherboard housing connecting plate B420 is located may be perpendicular to the third direction H3. In an embodiment of the present disclosure, the motherboard housing connecting plate B420 may be provided with a recessed groove, and the motherboard A400 may be placed in the recessed groove to reduce the thickness of the flexible display apparatus. Further, the recessed groove penetrates the motherboard housing connecting plate B420 along the third direction H3, so that the motherboard housing connecting plate B420 is hollowed out at the recessed groove; the motherboard A400 can be located in the hollow space. In this way, the thickness of the flexible display apparatus can be further reduced.

The motherboard housing connecting plate B420 can be placed on the back side of the elastic spacer A200. In other words, the motherboard housing connecting plate B420, the motherboard A400 and the battery module A300 may be located at the same side of the elastic spacer A200. The output port of the battery module A300 can be connected to the motherboard A400, and the power is supplied to the flexible display module A100 through the motherboard A400.

In some embodiments, referring to FIG. 9, the battery module A300 is not provided with the energy storage cells A301 at the position the motherboard housing B400 located, but is still provided with a flexible composite layer A302 for conducting electricity, so that the energy storage cells A301 on both sides of the motherboard housing B400 are electrically connected. In an embodiment of the present disclosure, referring to FIG. 9, the flexible composite layer A302 overlapping with the motherboard housing B400 can be narrowed and disposed between the motherboard A400 and one of the side walls B410 of the motherboard housing to give way for the motherboard A400. At the position of the motherboard housing B400, the width of the flexible composite layer A302 is determined to satisfy the electrical connection between the individual energy storage cells A301.

In some embodiments, the motherboard housing B400 can be connected with the elastic spacer A200, for example, the connection can be realized by bonding or screwing. The elastic spacer A200 can be connected with side walls B410 of the motherboard housing or the motherboard housing connecting plate B420, or can be connected with both the side walls B410 of the motherboard housing and the motherboard housing connecting plate B420.

In some embodiments, referring to FIG. 9 and FIG. 10, the elastic spacer A200 may be provided with a circuit board through hole A201; the flexible display apparatus may be provided with a flexible circuit board A101 connecting the motherboard A400 and the flexible display module A100, the flexible circuit board A101 is embedded in the circuit board through hole A201, and one end is connected to the flexible display module A100, and the other end is connected to the motherboard A400.

In an embodiment of the present disclosure, referring to FIG. 9, the flexible display apparatus may also be provided with a bendable rear housing A600. The rear housing A600 is disposed on the side of the battery module A300 away from the elastic spacer A200. The rear housing A600 can be connected to one or more of the side baffle B100, the end cover B300 and the motherboard housing B400, for example, the rear housing A600 can be bonded to the ends of the side end baffles B100, the end cover B300 and the motherboard housing B400 away from the elastic spacer A200. In this way, the rear housing A600 can be bent without hindering the bending performance of the flexible display apparatus. In addition, the rear housing A600 can cover the battery module A300 and the motherboard A400 to protect the battery module A300 and the motherboard A400.

In an embodiment of the present disclosure, the side of the end cover baffle B310 away from the energy storage cells A301 may be provided with a slot. The rear housing A600 can also be connected with the slot.

Fourth Embodiment

Figure 22:
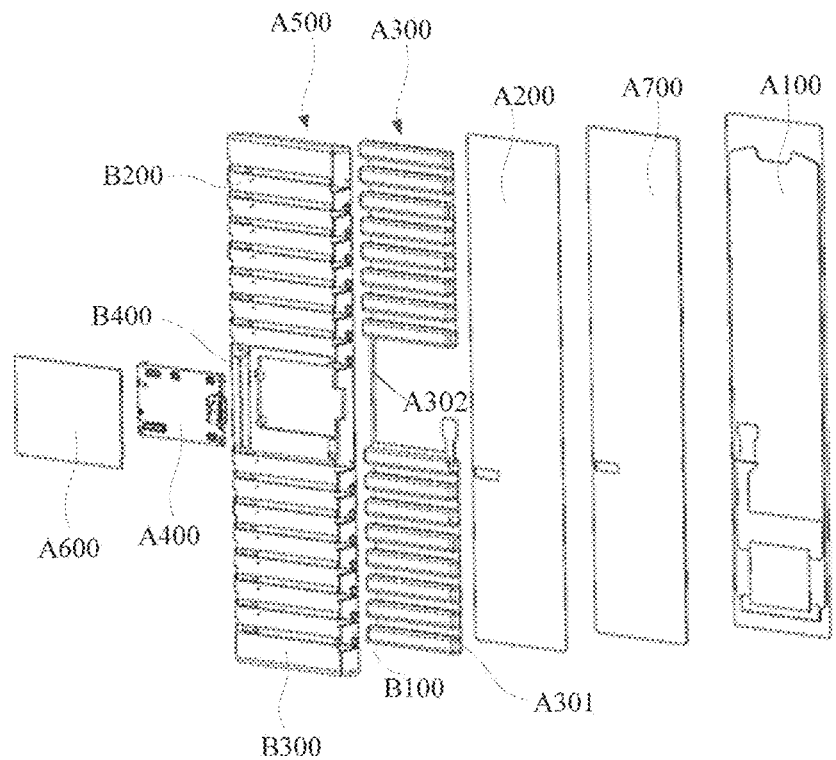
FIG. 22 is an exploded schematic diagram of a flexible display apparatus in an embodiment of the present disclosure.

The present disclosure provides a flexible display apparatus and a mobile terminal applying the flexible display apparatus. Referring to FIGS. 8 and 22, the flexible display apparatus includes a flexible display module A100, an elastic spacer A200, a battery module A300 and a bendable front housing A500 that are sequentially stacked along the third direction H3. The battery module A300 includes a flexible composite layer A302 connected to the elastic spacer A200 and a plurality of energy storage cells A301 connected to the side of the flexible composite layer A302 away from the elastic spacer A200 (see FIG. 22). The plurality of energy storage cells A301 are arranged in sequence along the first direction H1, and there is a gap between two adjacent energy storage cells A301. The battery module A300 can supply power to the flexible display module A100 through the flexible composite layer A302. The front housing A500 is provided with a bending neutral surface, and the elastic spacer A200 is fixedly arranged near the bending neutral surface.

In the present disclosure, the direction in which the plurality of energy storage cells A301 are sequentially arranged is the first direction, and the first direction is also the direction in which the flexible display apparatus can be bent. The length direction of the energy storage cell A301 is the second direction, and the first direction and the second direction are perpendicular to each other. The direction in which the flexible display module A100, the elastic spacer A200 and the battery module A300 are stacked is the third direction H3, and the third direction H3 is perpendicular to the first direction and the second direction. Referring to FIG. 8, in the present disclosure, the flexible display module A100 can emit light toward the side away from the elastic spacer A200 for display, therefore, the side of the flexible display apparatus where the flexible display module A100 is disposed can be used as the front side V1 of the flexible display apparatus, and the side where the battery module A300 is disposed can be used as the back side V2 of the flexible display apparatus. In the embodiments of the present disclosure, along the second direction, the direction away from the energy storage cells may be defined as the outer side of the flexible display apparatus, and the direction toward the energy storage cells is defined as the inner side of the flexible display apparatus.

In the flexible display apparatus provided by the present disclosure, the front housing A500 is provided with a bending neutral surface, and the elastic spacer A200 is fixedly arranged near the bending neutral surface, which makes the bending of the elastic spacer substantially consistent with the bending of the front housing A500, so that the elastic spacer is basically in a neutral state of no compression and no bending during bending. That is, the elastic spacer A200 is the neutral layer of the flexible display apparatus, which is neither stretched nor compressed. The elastic spacer A200 has elasticity, while the flexible display module A100 and the flexible composite layer A302 have good flexibility but lack sufficient elasticity, this makes the flexible display apparatus bend around the elastic spacer A200 when it is bent, the flexible display module A100 and the flexible composite layer A302 are respectively fixed on both sides of the elastic spacer A200, and the two are arranged close to the elastic spacer A200, so that the two are also very close to the neutral layer of the flexible display apparatus when they are bent, thus the tension or compression they bear is very small. In this way, not only can the elastic spacer A200 carry the flexible display module A100 and the flexible composite layer A302, but also can provide protection for the flexible display module A100 and the flexible composite layer A302. Not only that, since the elastic spacer A200 has a high elastic modulus, it has good flatness in the flattened state, and a smooth curved surface in the bent state. In this way, a flat or smooth supporting surface can be provided for the flexible display module A100, so that the flexible display module A100 can be in a flat state or a smoothly bent state as a whole, so as to prevent the flexible display module A100 from wrinkling and reducing the display effect.

In addition, in the flexible display apparatus of the embodiment of the present disclosure, because the neutral surface of bending is determined by the front housing A500, the elastic spacer does not necessarily have a very large elastic modulus, so that the material selection range of the elastic spacer is expanded; and after fatigue damage or elastic attenuation of the elastic spacer occurs, the flexible display apparatus can still be bent normally.

In some embodiments, the material of the elastic spacer A200 may be a metal material with a higher elastic modulus, such as stainless steel, titanium alloy and the like.

In some embodiments, the flexible display apparatus may further be provided with a first adhesive layer A700 between the flexible display module A100 and the elastic spacer A200, so as to adhere the flexible display module A100 on the elastic spacer A200. Alternatively, the first adhesive layer A700 may be double sided adhesive tape, especially, may be double sided adhesive foam tape.

In some embodiments, the flexible display apparatus may further be provided with a second adhesive layer between the flexible composite layer A302 and the elastic spacer A200, so as to adhere the flexible composite layer A302 on the elastic spacer A200. Alternatively, the second adhesive layer may be double sided adhesive tape, especially, may be double sided adhesive foam tape.

In the flexible display apparatus provided by the present disclosure, the elastic spacer A200 may be fixed on the front housing A500. Referring to FIG. 14, FIGS. 22 to 26, the front housing A500 includes side baffles B100 hinged in sequence, and the side baffles B100 are located on both sides of the energy storage cells A301 in the length direction. That is, along the length direction of the energy storage cell A301

(the second direction H2), the energy storage cell A301 is sandwiched between two opposite side baffles B100 to be protected by the two side baffles B100. Further, the front housing A500 may further include a baffle connecting plate B200, and the two side baffles B100 located at both ends of the energy storage cell A301 along its length direction are connected by the baffle connecting plate B200, and the baffle connecting plate B200 is located on the side of the energy storage cell A301 away from the elastic spacer A200. In this way, the back side of the energy storage cell A301 is protected by the baffle connecting plate B200. In other words, the side baffle B100 and the baffle connecting plate B200 form an accommodation cavity, and the energy storage cell A301 is accommodated in the accommodation cavity; the front housing unit can protect the energy storage cell A301, and prevent the energy storage cell A301 from being exposed and damaged.

In an embodiment of the present disclosure, the two side baffles B100 located at both ends of the energy storage cell A301 along its length direction and the baffle connecting plate B200 connecting the two side baffles B100 may be an integral structure, which can be used as a single front housing unit as a whole. In this way, the front housing A500 may include a plurality of front housing units hinged in sequence; the front housing unit includes side baffles B100 located at both ends of the energy storage cell A301 in the length direction and a baffle connecting plate B200 connecting the two side baffles B100; between two adjacent front housing units, the hinged connection is realized by the adjacent side baffles B100.

Figure 14:
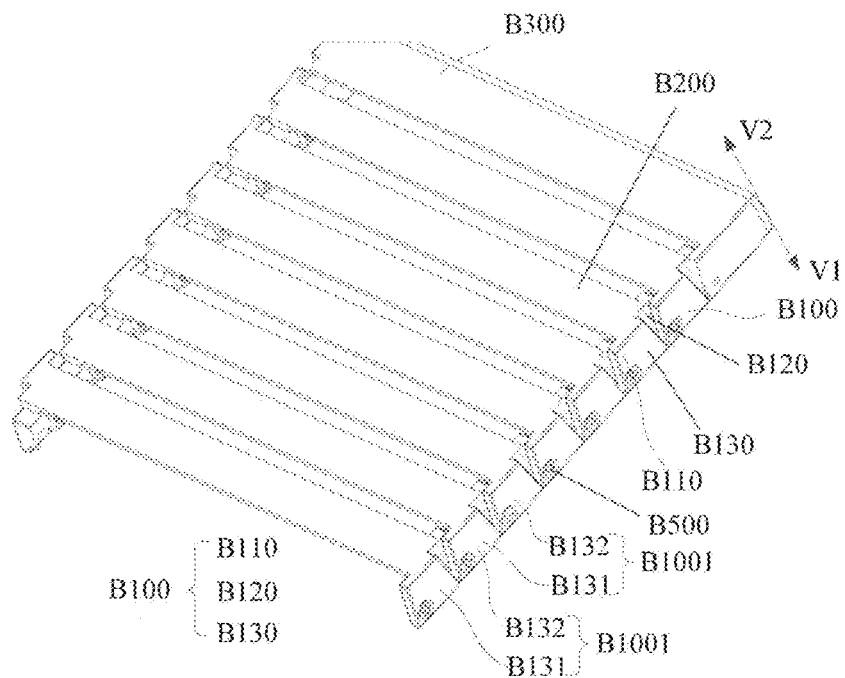
FIG. 14 is a schematic diagram of a partial structure of the front housing in an embodiment of the present disclosure, and the schematic diagram is a schematic diagram of the back side.
Figure 17:
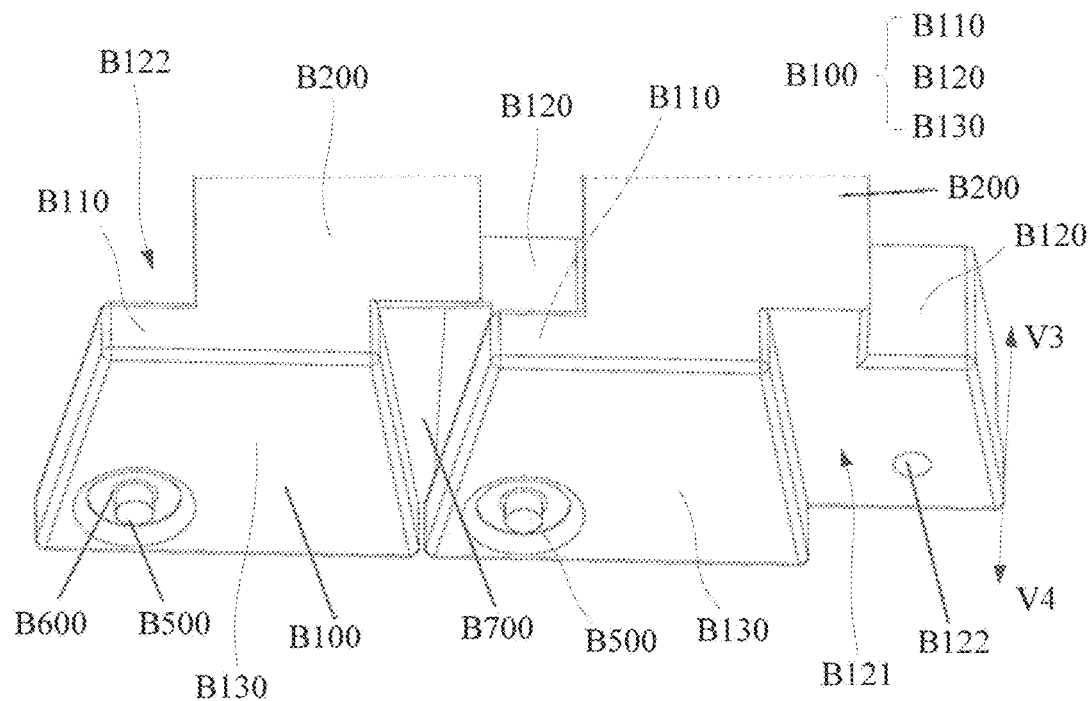
FIG. 17 is a schematic diagram showing the cooperation of two adjacent side baffles in a flattened state in an embodiment of the present disclosure.

Referring to FIGS. 14 and 17, the orthographic projection of the side baffle B100 on a plane perpendicular to the second direction H2 is a trapezoid, and may especially be an isosceles trapezoid. The size of the end of the side baffle B100 close to the flexible display module A100 in the first direction H1 is larger than the size of the end close to the energy storage cell A301 in the first direction H1. In other words, one end of the side baffle B100 at the back side V2 of the flexible display apparatus has a smaller size in the first direction H1, one end at the front side V1 of the flexible display apparatus has a larger size in the first direction H1. In this way, the flexible display apparatus can be bent or curled toward the back side V2 under the constraint of the side baffles B100.

Further, referring to FIGS. 15 to 21, the two ends of the side baffle B100 along the first direction H1 are respectively provided with an inside notch B111 and an outside notch B121. At the position where the inside notch B111 is provided, the side baffle B100 has an outer side wall B110 that is thinned and located at the outer side V4; at the position where the outside notch B121 is provided, the side baffle B100 has an inner side wall B120 that is thinned and located at the inner side V3. Where, both the inner side wall B120 and the outer side wall B110 are provided with hinge holes. In the present disclosure, the hinge hole located on the inner side wall B120 is defined as the first hinge hole B122, and the hinge hole located on the outer side wall B110 is defined as the second hinge hole B112.

In some embodiments, referring to FIG. 17, the side baffle B100 includes an outer side wall B110, a baffle body B130 and an inner side wall B120 which are arranged in sequence along the first direction H1, the thickness of the baffle body B130 is greater than the thickness of the inner side wall B120 and the thickness of the outer side wall B110 respectively.

Referring to FIG. 14, a side baffle group B1001 is formed by two adjacent side baffles B100, in the side baffle group B1001, one of the side baffles B100 may be a first side baffle B131, and the other side baffle B100 may be a second side baffle B132. Where, the inner side wall B120 of the first side baffle B131 and the outer side wall B110 of the second side baffle B132 are disposed adjacent to each other. The inner side wall B120 of the first side baffle B131 extends into the inside notch B111 of the second side baffle B132, and the outer side wall B110 of the second side baffle B132 extends into the outside notch B121 of the first side baffle B131, the first hinge hole B122 of the first side baffle B131 is aligned with the second hinge hole B112 of the second side baffle B132.

Figure 19:
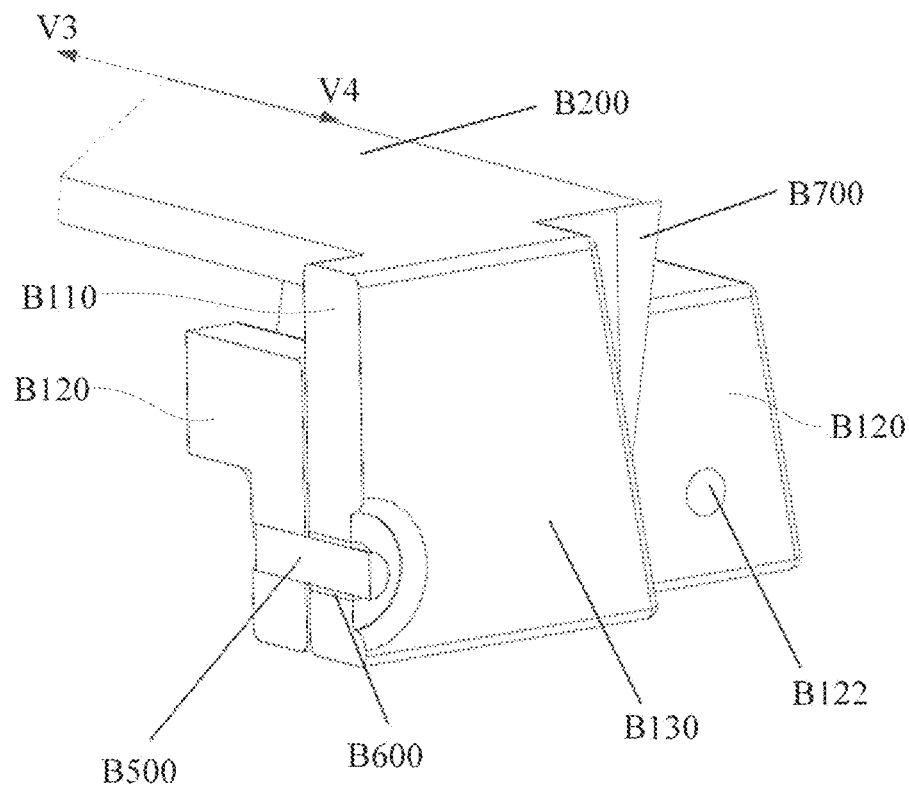
FIG. 19 is a schematic structural view showing a structure of two adjacent side baffles being cutting at a position of the hinge holes in an embodiment of the present disclosure.
Figure 20:
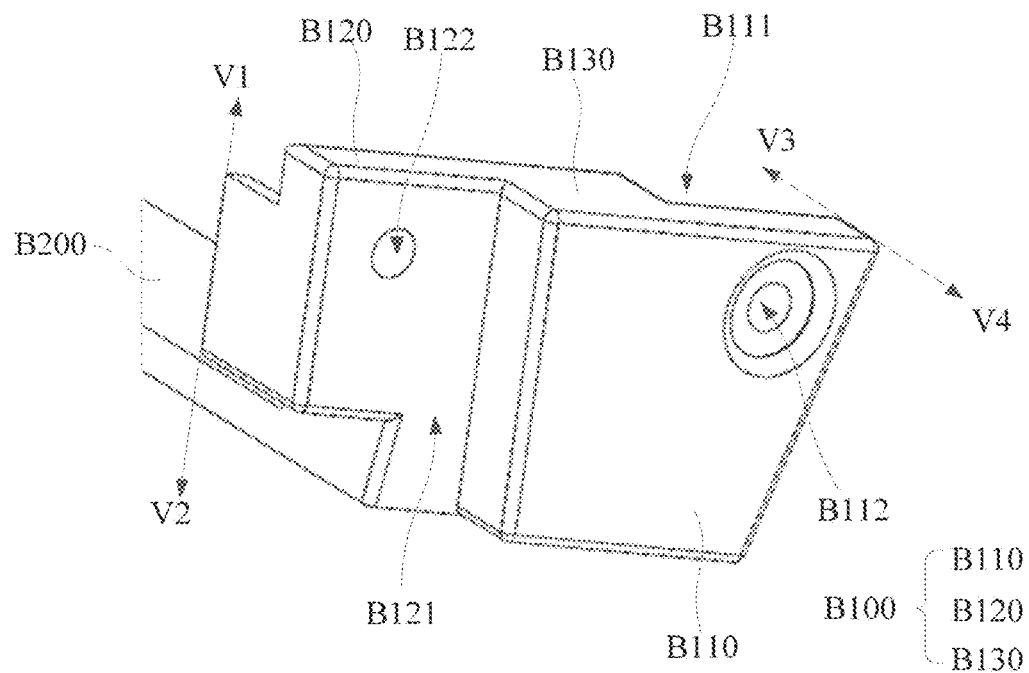
FIG. 20 is a schematic perspective view of a side baffle in an embodiment of the present disclosure.

Referring to FIG. 19, the front housing A500 also includes a pin B500 that is inserted into the aligned first second hinge hole B122 and the second hinge hole B112 such that the first side baffle B131 and the second side baffle B132 are hinged through the pin B500.

Figure 23:
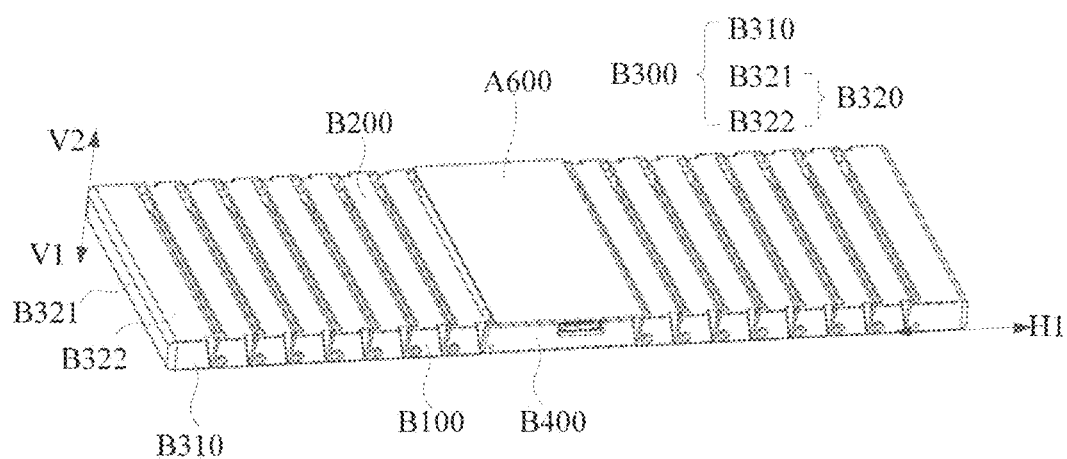
FIG. 23 is a schematic perspective view showing the back side of the flexible display apparatus in a flattened state in an embodiment of the present disclosure.
Figure 24:
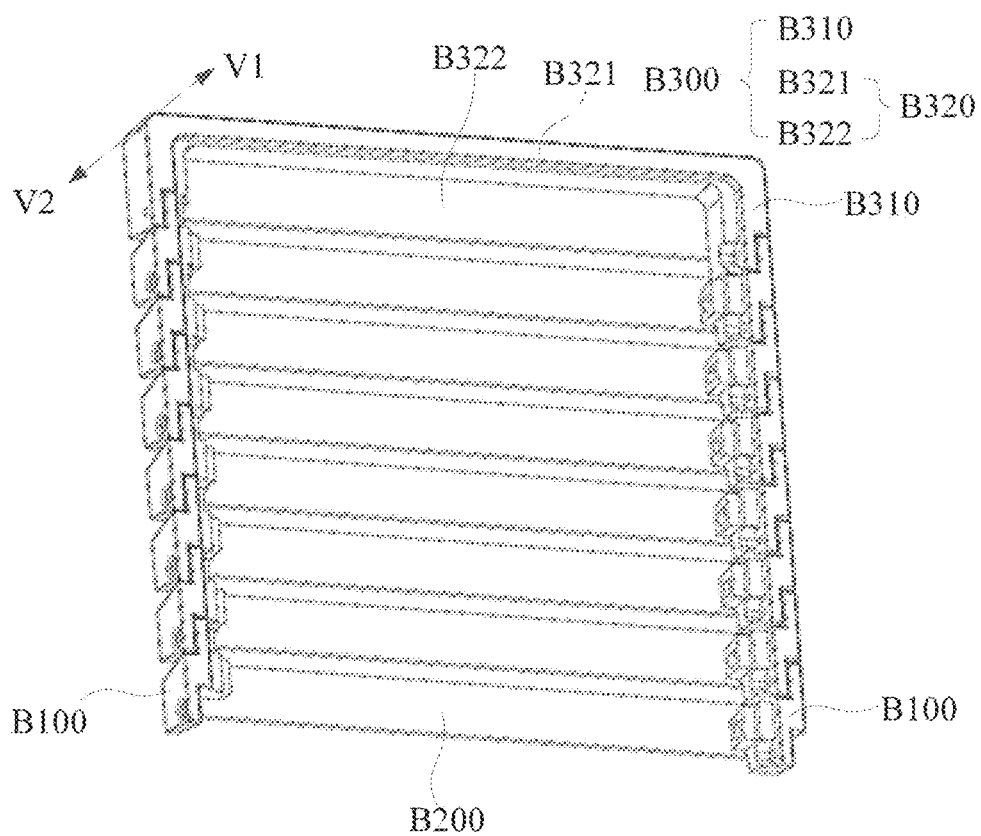
FIG. 24 is a schematic perspective view showing the front side of the front housing in a flattened state in an embodiment of the present disclosure.
Figure 25:
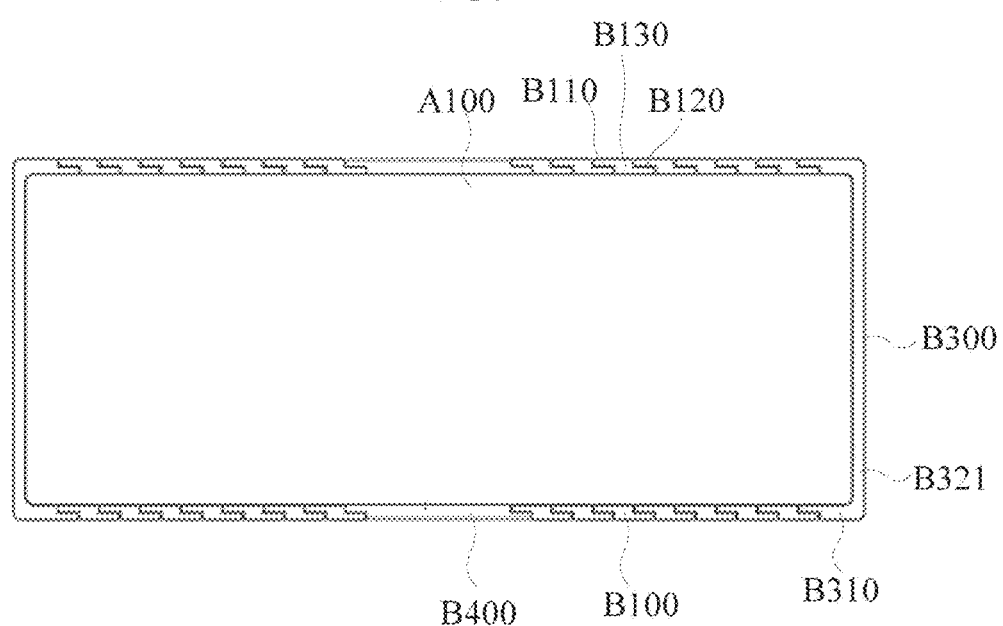
FIG. 25 is a schematic structural diagram of a top view of the front side of the flexible display apparatus in a flattened state in an embodiment of the present disclosure.
Figure 26:
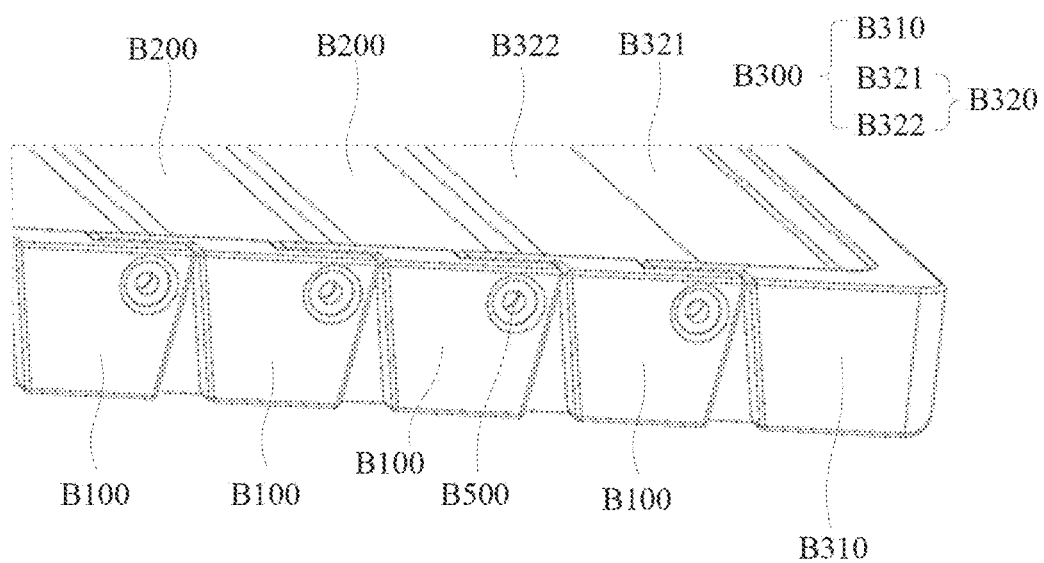
FIG. 26 is a schematic perspective view of a partial structure of the back side of the front housing in a flattened state in an embodiment of the present disclosure.

In an embodiment of the present disclosure, referring to FIG. 17, FIG. 23, and FIG. 26, when the flexible display apparatus is unfolded, the top corner of the first side baffle B131 closest to the second side baffle B132 can abut against the bottom wall of the inside notch B111 of the second side baffle B132, so that the top corner cannot continue to move inward from the inside notch B111 of the second side baffle B132, thereby avoiding reverse bending of the flexible display apparatus, so that the flexible display apparatus is in a flattened state.

Figure 18:
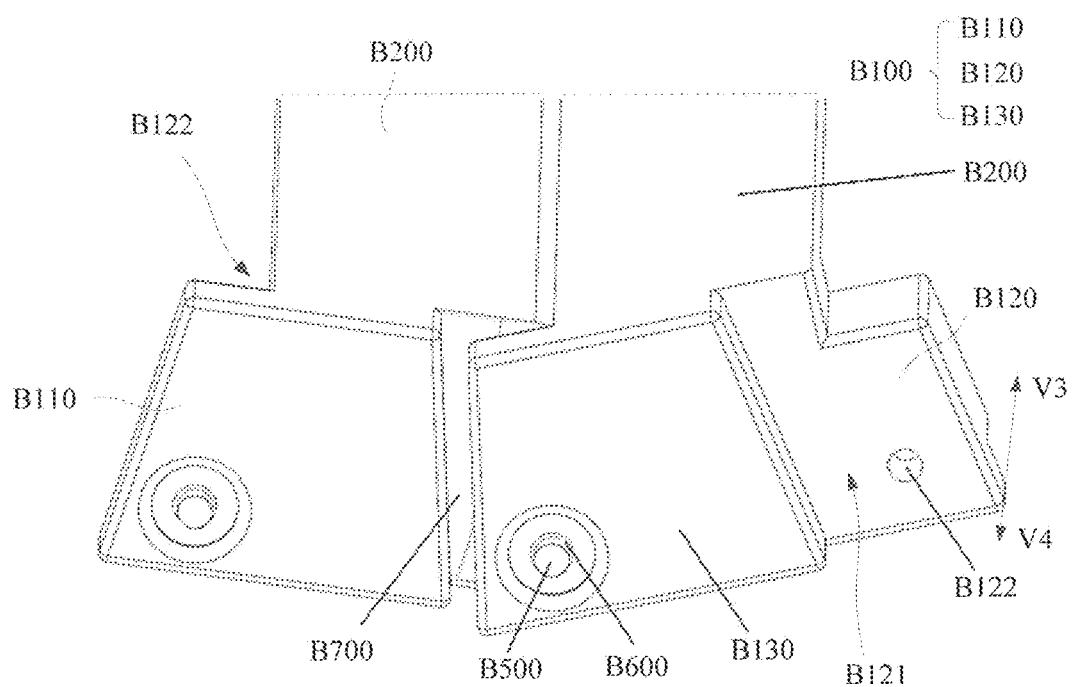
FIG. 18 is a schematic diagram showing the cooperation of two adjacent side baffles in a bent state in an embodiment of the present disclosure.

In an embodiment of the present disclosure, referring to FIG. 18, when the flexible display apparatus is bent toward the back side V2, two adjacent front housing units can rotate around the pin B500; when the baffle connecting plates B200 of two adjacent front housing units move to collide with each other, the flexible display apparatus cannot continue to bend between the two front housing units. In this way, by adjusting the width of the baffle connecting plate B200, the curvature of the flexible display apparatus during bending can be adjusted.

In some embodiments, the baffle connecting plate B200 is connected to one end of the side baffle B100 on the back side V2, and is connected to the baffle body B130. Further, the baffle connecting plate B200 can also be connected with part of the inner side wall B120 or part of the outer side wall B110 to increase the width of the baffle connecting plate B200, and the adjustment of the bending curvature is realized and the protection effect of the energy storage cell A301 is improved.

Figure 15:
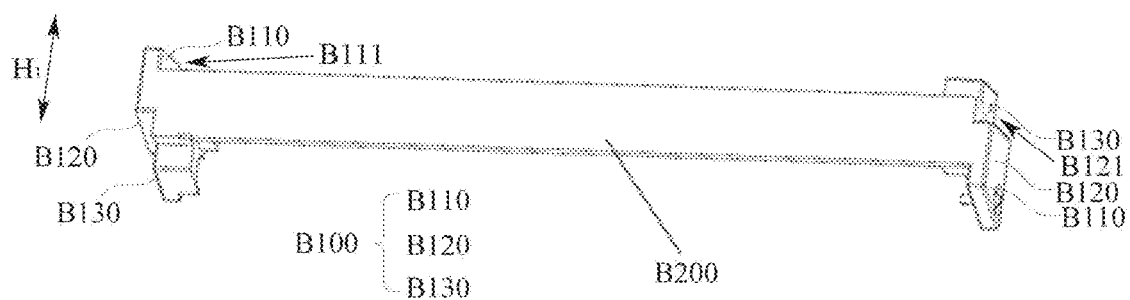
FIG. 15 is a schematic perspective view showing a housing unit in an embodiment of the present disclosure.
Figure 16:
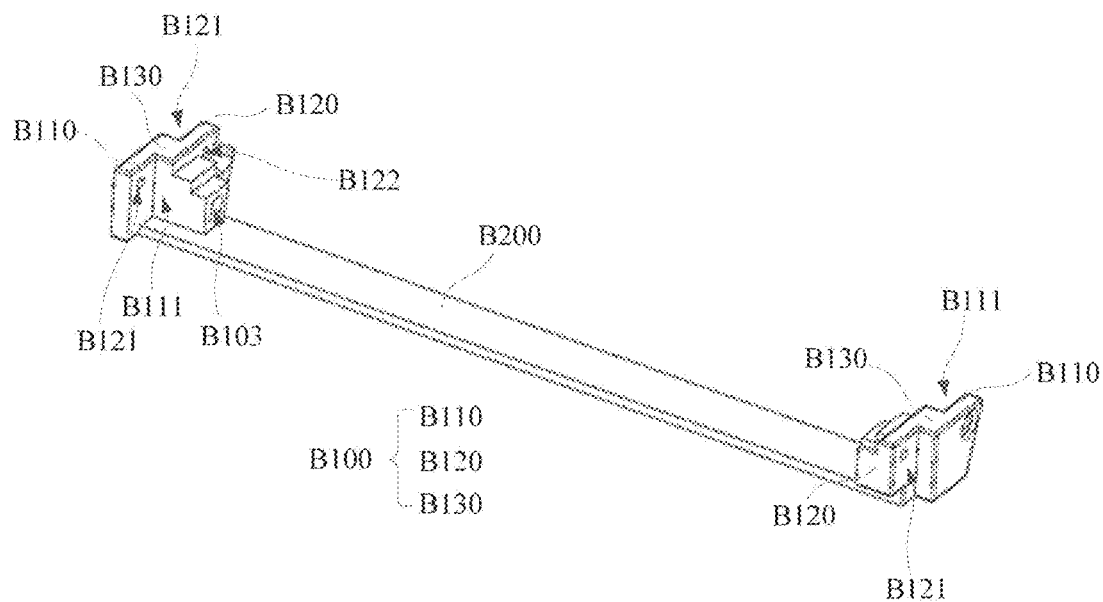
FIG. 16 is a schematic perspective view showing a housing unit in an embodiment of the present disclosure.

As shown in FIG. 15, the two opposite side baffles B100 located at both ends of the baffle connecting plate B200 and the baffle connecting plate B200 form a hinged unit. In the two side baffles B100 of the hinge unit, the notches located on the same side of the baffle connecting plate B200 in the first direction H1 may be the inside notches B111 at the same time, or one may be the inside notch B111 and the other may be the outside notch B121. Exemplary, in one embodiment of the present disclosure, referring to FIG. 15, in the two side baffles B100 of the hinged unit, the notches located on the same side of the baffle connecting plate B200 in the first direction H1, one notch is an inside notch B111 and the other one is an outside notch B121. Further, one end of the baffle connecting plate B200 is connected to the outer side wall B110 and the baffle body B130 of one side baffle B100, and the other end is connected to the inner side wall B120 and the baffle body B130 of the other side baffle B100.

In an embodiment of the present disclosure, the two side baffles B100 of the same hinge unit are provided with four hinge holes in total; the two hinge holes located on the same side of the baffle connecting plate B200 in the first direction H1 may be coaxially arranged. So that the two pins B500 matched with the two hinge holes can be coaxially arranged, thereby forming a rotation axis for the rotation of the two adjacent hinge units. The rotation axes of the hinge units are connected to the neutral surface of the front housing A500 in sequence, that is, the neutral surface is a plane where the central axes of the pins B500 are located, so that the elastic spacer A200 is disposed close to the rotation axis of each hinge unit.

In some embodiments, one of the first hinge hole B122 and the second hinge hole B112 is provided with an inner thread, and the end of the pin B500 that is matched with the inner thread is provided with an outer thread. In this way, the pin B500 can pass through the aligned first hinge hole B122 and the second hinge hole B112, and be connected through the inner thread and the outer thread. Exemplary, in an embodiment of the present disclosure, the first hinge hole B122 may be provided with an inner thread, and the end of the pin B500 that matches the first hinge hole B122 is provided with an outer thread. When the pin B500 is passed through the aligned first hinge hole B122 and the second hinge hole B112, it can be connected to the first hinge hole B122 by screwing. So that the fixed connection between the pin B500 and the inner side wall B120 can be achieved, and the second side baffle B132 is rotatably arranged around the pin B500.

In an embodiment of the present disclosure, one end of the pin B500 away from the external thread has a bolt head, and the bolt head may be provided with a groove or protrusion for assembly, so as to facilitate the assembly of the pin B500.

In an embodiment of the present disclosure, the outer side V4 of the outer side wall B110 is further provided with a counterbore coaxial with the second hinge hole B112, and the counterbore is used to accommodate the bolt head of the pin B500.

In an embodiment of the present disclosure, the first hinge hole B122 may be a blind hole, that is, the first hinge hole B122 does not penetrate through the inner side wall B120. Of course, in other embodiments of the present disclosure, the first hinge hole B122 may also be a through hole passing through the inner side wall B120.

In some embodiments, referring to FIG. 17 and FIG. 19, the front housing A500 may further include a damping ring B600, and the damping ring B600 is disposed in the hinge hole without internal thread; the pin is passed through and disposed in the damping ring. Exemplary, the damping ring B600 is passed through and disposed in the second hinge hole B112 and is matched and connected with the second hinge hole B112; the pin B500 is inserted in the damping ring B600 and matched with the damping ring B600. In this way, the damping ring B600 will dampen the rotation between the outer side wall B110 and the pin B500. Therefore, the rotation between the first side baffle B131 and the second side baffle B132 can be stopped at any time and a certain degree of locking can be achieved, that is, the random stop and position locking of the rotation between the hinge units can be realized. In this way, within the bendable range of the flexible display apparatus, the flexible display apparatus can be arbitrarily adjusted and maintained in a bent state, which overcomes the problem that only two states of flattening and complete bending can be achieved in the related art, and can expand the bending state of the flexible display apparatus.

In some embodiments, the damping ring B600 can be a soft rubber annular sleeve, such as a latex sleeve, a rubber sleeve, a silicone sleeve, and the like.

In some embodiments, referring to FIGS. 17 and 19, on the outer side V4 of the inner side wall B120 or the inner side V3 of the outer side wall B110, the side baffle B100 may be provided with a damping layer B700. When the first side baffle B131 and the second side baffle B132 are rotated, the damping layer B700 can exert a damping effect on the rotation between the inner side wall B120 and the outer side wall B110 cooperated with each other, this enables the rotation between the first side baffle B131 and the second side baffle B132 to be stopped at any time and to achieve a certain degree of position locking, that is, the rotation between the hinged units can be stopped at any time and then can be locked. In this way, within the bendable range of the flexible display apparatus, the flexible display apparatus can be arbitrarily adjusted and maintained in a bent state, which overcomes the problem that only two states of flattening and complete bending can be achieved in the related art, and can expand the bending state of the flexible display apparatus.

In some embodiments, for example, referring to FIGS. 17 and 19, the side baffle B100 is provided with a damping layer B700 on the outer side V4 of the inner side wall B120.

In some embodiments, the damping layer B700 may be a rubber layer, a latex layer, a silicone layer, or a layer of other elastic materials.

In some embodiments, the damping layer B700 may include a first portion close to the baffle body B130 and a second portion away from the baffle body B130, where, the thickness of the first portion is not less than the thickness of the second portion, and the thickness of the second portion gradually decreases along the direction away from the baffle body B130. So that the portion of the damping layer B700 close to the edge of the side baffle B100 may have a wedge-shaped structure, and the thickness of the damping layer B700 gradually decreases along the direction close to the edge of the side baffle B100, which can play a guiding role.

Figure 21:
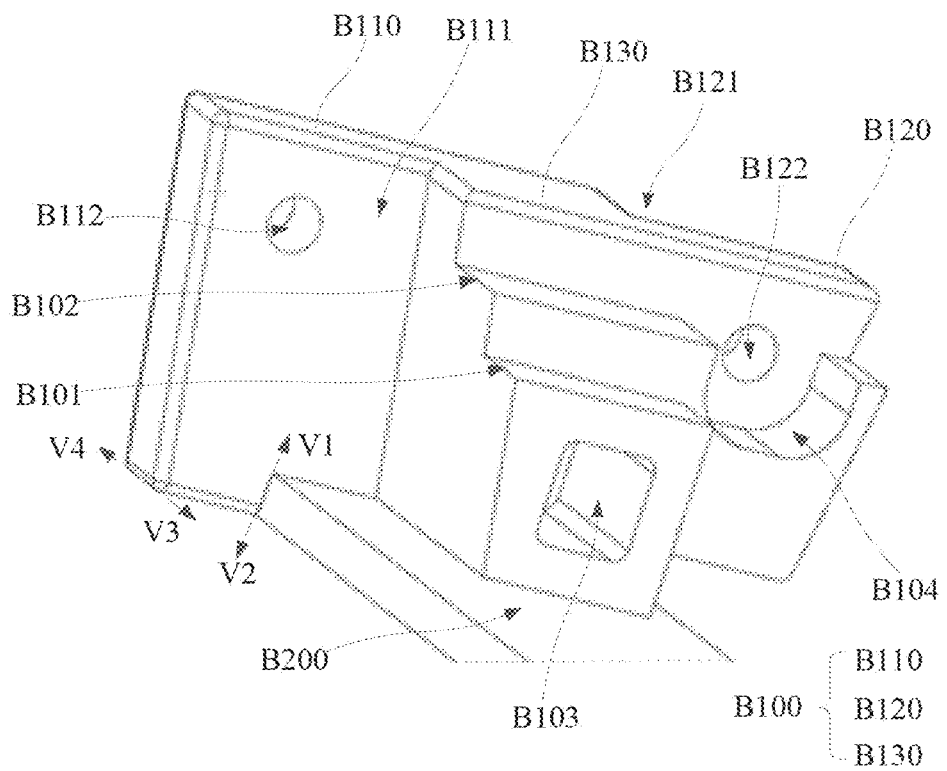
FIG. 21 is a schematic perspective view of a side baffle in an embodiment of the present disclosure.

Referring to FIG. 21, the side baffle B100 may be provided with a first bearing surface B101, the first bearing surface B101 faces the front side V1 of the flexible display apparatus, and extends inward along the inner side V3 direction to meet the inner side surface of the side baffle B100 to support the elastic spacer A200. In this way, the elastic spacer A200 can be in contact with the first bearing surface B101 and be connected to the side baffle B100 by bonding, welding, screw connection or other feasible connection methods.

In an embodiment of the present disclosure, referring to FIG. 21, the first bearing surface B101 is close to the position of the first hinge hole B122 in the third direction, so that the first bearing surface B101 can be made as close to the neutral surface of the front housing A500 as possible, so that the elastic spacer A200 can be made close to the neutral surface of the front housing A500. Further, the first bearing surface B101 is located on the side of the first hinge hole B122 close to the back side V2 in the third direction. In this way, considering the thickness of the elastic spacer A200, the flexible display module A100 and the flexible composite layer A302 can both be brought closer to the neutral surface of the front housing A500.

In some embodiments, referring to FIG. 21, the first bearing surface B101 may be located on the baffle body B130.

Further, in the technical solution, referring to FIG. 21, the side baffle B100 is further provided with a second bearing surface B102. In the second direction H2, the second bearing surface B102 is located on the side of the first bearing surface B101 away from the energy storage cell A301; in the third direction H3, the second bearing surface B102 is located on the side of the first bearing surface B101 away from the energy storage cell A301. In this way, the first bearing surface B101 and the second bearing surface B102 make the side baffle B100 step-shaped on the front side V1 of the flexible display apparatus. The flexible display apparatus may further include a flexible light-transmitting cover plate, and the flexible light-transmitting cover plate may be disposed on the side of the flexible display module A100 away from the elastic spacer A200 to protect the flexible display module A100. The edge of the flexible light-transmitting cover plate can be supported on the second bearing surface B102 and connected to the side baffle B100 by means of bonding.

Exemplary, in an embodiment of the present disclosure, as shown in FIG. 21, the side baffle B100 is provided with a first protrusion extending toward the inner side V3 on the inner side wall B120 and the baffle body B130, and a second protrusion located on the inner side of the first protrusion portion and extending toward the inner side V3. the second protruding portion may form the first bearing surface B101 of the side baffle B100, and the first protruding portion may form the second bearing surface B102 of the side baffle B100. According to this embodiment, the first protrusion and the second protrusion may be covered by the flexible light-transmitting cover plate, which makes the front side V1 of the side baffle B100 expose only part of the inner side wall, the outer side wall and the baffle body; referring to FIG. 25, the side baffles B100 are provided with notches so that the exposed portion is bent.

In an embodiment of the present disclosure, referring to FIG. 21, the side baffle B100 may be further provided with a lightening hole B103, the lightening hole B103 is located on the baffle body B130 and between the first bearing surface B101 and the hinged baffle connecting plate B200. Further, the lightening hole B103 is a blind hole whose opening faces the inner side V3. In this way, the weight of the side baffle B100 can be reduced, thereby reducing the weight of the flexible display apparatus and the mobile terminal, which is beneficial to the wearing and use of the mobile terminal. Further, the lightening hole B103 is provided in the first protrusion and the second protrusion of the side baffle B100.

In an embodiment of the present disclosure, referring to FIG. 21, the side baffle B100 may be further provided with an avoidance notch B104, the avoidance notch B104 is located at the inner side V3 of the inner side wall B120 and opens on the second bearing surface B102, the first hinge hole B122 is a through hole, and its central axis passes through the avoidance notch B104. In this way, even if the pin B500 protrudes from the first hinge hole B122 to the inner side V3, the protruding part will be accommodated in the avoidance notch B104, thereby avoiding the impact on the side baffle B100 and the flexible light-transmitting cover plate. In addition, the arrangement of the avoidance notch B104 enables the flexible display apparatus to have greater tolerance to the size and installation error of the pin B500, thereby improving the process window of the flexible display apparatus, which is beneficial to the preparation of the flexible display apparatus. Further, the avoidance notch B104 is provided on the first protruding portion of the side baffle B100.

Figure 27:
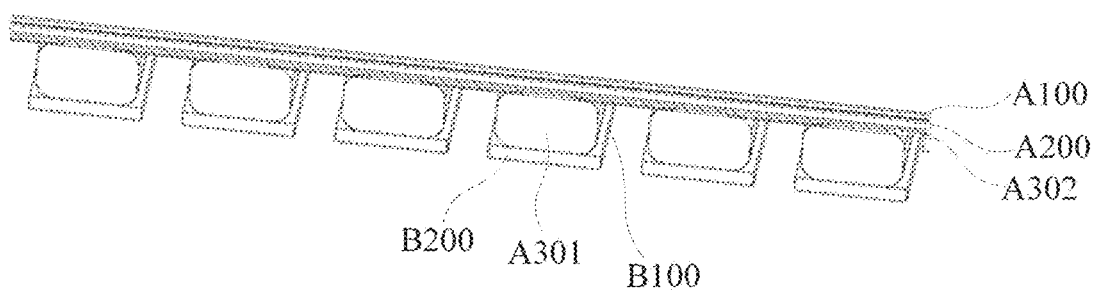
FIG. 27 is a schematic partial cross-sectional view of a structure of the flexible display apparatus cut along a direction perpendicular to the second direction in a flattened state in an embodiment of the present disclosure.
Figure 28:
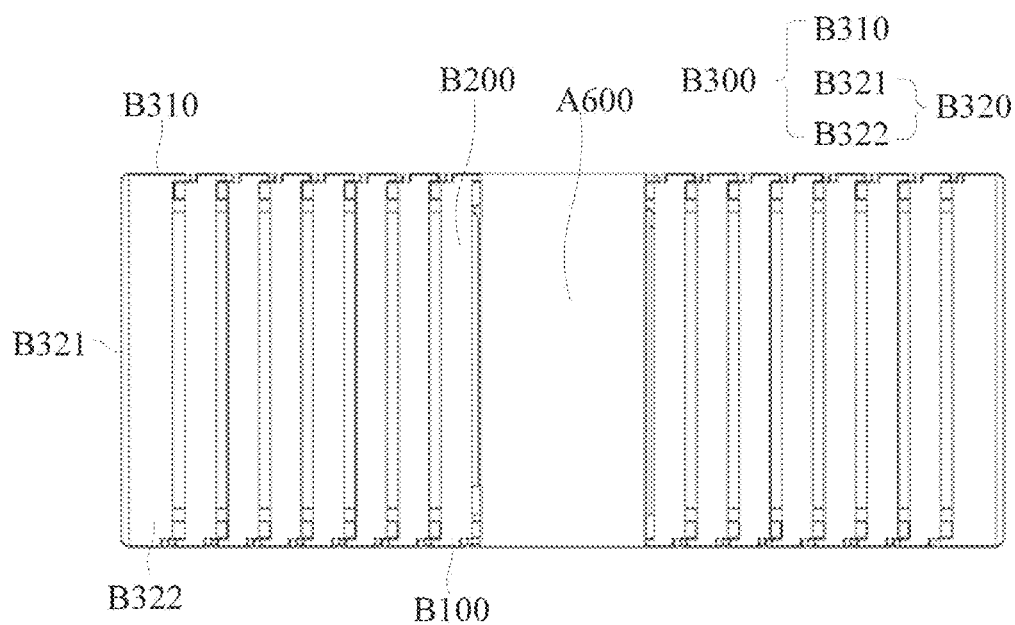
FIG. 28 is a schematic structural diagram of a top view of the back side of the flexible display apparatus in a flattened state in an embodiment of the present disclosure.

In an embodiment of the present disclosure, referring to FIG. 27, the energy storage cells A301 that are not located at the ends of the flexible display apparatus may be disposed in the accommodating spaces of the hinged units in a one-to-one correspondence.

In some embodiments, referring to FIG. 14, FIG. 22, FIG. 23, FIG. 24, FIG. 26 and FIG. 28, the front housing A500 may further include an end cover B300 located at the end of the flexible display apparatus, and the end cover B300 is hinged with the adjacent hinge unit. The end cover B300 includes two end cover baffles B310 disposed opposite to each other, and an end cover connecting plate B320 connecting the two end cover baffles B310. The end cover connecting plate B320 may include a first end cover plate B321 and a second end cover plate B322. An accommodating space is formed between the two end cover baffles B310, the first end cover plate B321 and the second end cover plate B322, the energy storage cell A301 located at the end of the flexible display apparatus can be accommodated in the accommodating space.

In an embodiment of the present disclosure, the overall shape of the end cover baffle B310 may be a right-angled trapezoid. In the flattened state, the edges of the end cover baffle B310 on the front side V1 and the back side V2 of the flexible display apparatus are respectively parallel to the first direction H1, and the edges away from the adjacent hinge unit are arranged along the third direction H3. The end cover baffle B310 has an end with smaller size in the first direction H1, and the end is located at the back side V2 of the flexible display apparatus. Where, the end cover baffle B310 is close to one end of the adjacent side baffle B100, and is hinged with the side baffle B100. In this way, the flexible display apparatus can also be bent between the end cover B300 and the adjacent side baffle B100.

In an embodiment of the present disclosure, the end cover baffle B310 may also be provided with a notch at the position adjacent to the adjacent side baffle B100 to form a thin wall. a hinge hole may be formed on the thin wall, the hinge hole is aligned with the hinge holes on the adjacent side baffle B100, and the hinge holes are connected by a pin. The position where the notch is provided in the portion of the end cover baffle B310 close to the adjacent side baffle B100 and the position where the thin wall is formed are based on the ability of the end cover baffle B310 to cooperate with the adjacent side baffle B100; for example, if the side of the adjacent side baffle B100 close to the end cover baffle B310 is formed with an inside notch and an outer side wall, then the side of the end cover baffle B310 close to the adjacent side baffle B100 is formed with an outside notch and an inner side wall. On the contrary, if the side of the adjacent side baffle B100 close to the end cover baffle B310 is formed with an outside notch and an inner side wall, then the side of the end cover baffle B310 close to the adjacent side baffle B100 is formed with an inside notch and an outer side wall.

Exemplary, the end cover baffle B310 and the adjacent side baffle B100 can also form a combination similar to the side baffle group B1001, the shape and connection relationship of the two adjacent parts may be the same as or similar to the shape and connection relationship of the adjacent parts of the two side baffles in the side baffle group B1001.

In some embodiments, the end cover baffle B310 may be provided with a third bearing surface for supporting the elastic spacer A200, and the elastic spacer A200 is carried on the third bearing surface and is fixedly connected to the end cover baffle B310. Further, when the flexible display apparatus is flatted, the first bearing surface B101 and the third bearing surface are coplanar.

In some embodiments, the end cover baffle B310 may be provided with a fourth bearing surface for carrying the flexible light-transmitting cover plate, and the flexible light-transmitting cover plate is carried on the fourth bearing surface and fixedly connected to the end cover baffle B310. Further, when the flexible display apparatus is flatted, the second bearing surface B102 and the fourth bearing surface are coplanar.

In some embodiments, the size (height) of the end cover baffle B310 in the first direction H1 may be the same as the size (height) of the side baffle B100 in the first direction H1.

In some embodiments, the first end cover plate B321 is located on the side of the energy storage cell A301 at the end that is far away from other energy storage cells A301. When the flexible display apparatus is flatted, the plane where the first end cover plate B321 is located may be perpendicular to the first direction H1, the extension direction of the first end cover plate B321 may be the same as the length direction of the energy storage cell A301. In this way, when the flexible display apparatus is bent into a ring shape, the two first end cover plate B321 at both ends of the flexible display apparatus can be aligned with each other and make surface-to-surface contact, so that the flexible display apparatus presents a complete closed-loop ring shape.

In an embodiment of the present disclosure, the two first end cover plates B321 disposed at both ends of the flexible display apparatus may be provided with connecting pieces that cooperate with each other, so that the two first end cover plates B321 can be connected to each other and the flexible display apparatus can maintain a closed-loop state. The connecting pieces cooperated with each other may be a connecting piece such as two magnetic pieces with opposite magnetism, hook-and-loop fasteners that cooperate with each other, snap-connecting components that cooperate with each other, whichever can realize a separable connection.

In some embodiments, the size (height) of the first end cover plate B321 in the first direction H1 may be the same as the size (height) of the end cover baffle B310 in the first direction H1.

In some embodiments, the second end cover plate B322 is located at the side of the energy storage cell A301 away from the elastic spacer A200, and its two ends are respectively connected to the side baffles B100, and its edge close to the flexible display apparatus is connected to the first end cover plate B321.

In some embodiments, referring to FIG. 22, the flexible display apparatus further includes a motherboard A400. The front housing A500 may further include a motherboard housing B400, and the motherboard housing B400 is used to fix the motherboard A400. In the first direction H1, the energy storage cell A301 are distributed at both sides of the motherboard housing B400. In other words, referring to FIGS. 22 and 23, the energy storage cells A301 are divided into two groups. The energy storage cells A301 in each group are arranged in sequence along the first direction H1; the two groups of energy storage cells A301 are respectively located on both sides of the motherboard housing B400. Correspondingly, the side baffles B100 can also be divided into two groups corresponding to the two groups of energy storage cells A301, and each group of the side baffles B100 are arranged to fit with a corresponding group of energy storage cells A301. The number of the end covers B300 is two, and they are located on both sides of the motherboard housing B400 respectively. In each group of energy storage cells A301, the energy storage cell A301 farthest from the motherboard housing B400 is located in the end cover B300 on the same side.

In other words, the front housing A500 includes a first region, a second region and a third region arranged along the first direction; the energy storage cells are disposed in the first region and the third region; the motherboard is disposed in the second region.

Further, the two groups of energy storage cells A301 can be connected to the motherboard through the same flexible circuit board, or can be connected to the motherboard through the flexible circuit board respectively.

In an embodiment of the present disclosure, the number of the energy storage cells A301 in each of the two groups of energy storage cells A301 is the same, so that the motherboard housing B400 may be located in the middle of the front housing A500. When the flexible display apparatus is bent into a closed ring shape, the motherboard housing B400 may be disposed opposite to the joint of the two end covers B300. According to the embodiment, a flexible display apparatus and a terminal may each include a rigid region that is not bendable, and include two bendable regions on both sides of the rigid region. The motherboard is located in the rigid region, and each energy storage cell is located in the bendable region.

In an embodiment of the present disclosure, the size of the motherboard housing B400 in the first direction H1 is larger than the size of the side baffle B100 in the first direction H1. Because the motherboard housing B400 is rigid and does not participate in bending, the flexible display apparatus can form a relatively flat display plane in the area of the motherboard housing B400 after bending, and form curved surfaces on both sides thereof. According to this arrangement, referring to FIG. 13, the position of the motherboard housing B400 corresponds to the back side of the human wrist; when the motherboard housing B400 is placed on the back of the human wrist, other components on both sides of the motherboard housing B400 can be bent toward the wrist to form an arc covering the wrist. So that the flexible display apparatus and mobile terminal of the present disclosure can be adapted to be worn on the wrist of a person by bending.

In some embodiments, referring to FIG. 12, the motherboard housing B400 includes side walls B410 of the motherboard housing which are opposite to each other, and a motherboard housing connecting plate B420 connected to the side walls B410 of the motherboard housing, the side wall B410 of the motherboard housing is hinged with the adjacent side baffle B100. In the flattened state of the flexible display apparatus, the plane on which the side wall B410 of the motherboard housing is located may be perpendicular to the second direction H2 and extend along the first direction H1. The side walls B410 of the motherboard housing and the motherboard housing connecting plate B420 may form an accommodating space, and the motherboard A400 may be completely accommodated in the accommodating space.

In some embodiments, as a whole, the side wall B410 of the motherboard housing may be in a trapezoidal structure. Where, the size of the end of the motherboard housing B400 away from the elastic spacer A200 is smaller than the end of the motherboard housing B400 close to the elastic spacer A200, so that the flexible display apparatus can also be bent between the motherboard housing B400 and the side baffle B100, thereby improving the bending performance of the flexible display apparatus.

In an embodiment of the present disclosure, the side wall B410 of the motherboard housing may also be provided with a notch at the position adjacent to the adjacent side baffle B100 to form a thin wall. a hinge hole may be formed on the thin wall, the hinge hole is aligned with the hinge holes on the adjacent side baffle B100, and the hinge holes are connected by a pin. Where, the position where the notch is provided in the portion of the side wall B410 of the motherboard housing close to the adjacent side baffle B100 and the position where the thin wall is formed is based on the ability to cooperate with the adjacent side baffle B100; for example, if the side of the adjacent side baffle B100 close to the side wall B410 of the motherboard housing is formed with an inside notch and an outer side wall, then the side of the side wall B410 close to the adjacent side baffle B100 is formed with an outside notch and an inner side wall. On the contrary, if the side of the adjacent side baffle B100 close to the side wall B410 of the motherboard housing is formed with an outside notch and an inner side wall, then the side of the side wall B410 of the motherboard housing close to the adjacent side baffle B100 is formed with an inside notch and an outer side wall.

Exemplary, the side wall B410 of the motherboard housing and the adjacent side baffle B100 can also form a combination similar to the side baffle group B1001, the shape and connection relationship of the two adjacent parts may be the same as or similar to the shape and connection relationship of the adjacent parts of the two side baffles in the side baffle group B1001.

In some embodiments, the plane on which the motherboard housing connecting plate B420 is located may be perpendicular to the third direction H3. In an embodiment of the present disclosure, the motherboard housing connecting plate B420 may be provided with a recessed groove, and the motherboard A400 may be placed in the recessed groove to reduce the thickness of the flexible display apparatus. Further, the recessed groove penetrates the motherboard housing connecting plate B420 along the third direction H3, so that the motherboard housing connecting plate B420 is hollowed out at the recessed groove; the motherboard A400 can be located in the hollow space. In this way, the thickness of the flexible display apparatus can be further reduced.

In some embodiments, the motherboard housing connecting plate B420 can be placed on the back side of the elastic spacer A200. In other words, the motherboard housing connecting plate B420, the motherboard A400 and the battery module A300 may be located at the same side of the elastic spacer A200. The output port of the battery module A300 can be connected to the motherboard A400, and the power is supplied to the flexible display module A100 through the main motherboard A400.

In some embodiments, referring to FIG. 22, the battery module A300 is not provided with the energy storage cells A301 at the position of the motherboard housing B400, but is still provided with a flexible composite layer A302 for conducting electricity, so that the energy storage cells A301 on both sides of the motherboard housing B400 are electrically connected. In an embodiment of the present disclosure, referring to FIG. 22, the flexible composite layer A302 overlapping with the motherboard housing B400 can be narrowed and disposed between the motherboard A400 and one of the side walls B410 of the motherboard housing to give way for the motherboard A400. At the position of the motherboard housing B400, the width of the flexible composite layer A302 is determined to satisfy the electrical connection between the individual energy storage cells A301.

In some embodiments, the motherboard housing B400 can be connected with the elastic spacer A200, for example, the connection can be realized by bonding or screwing. The elastic spacer A200 can be connected with side walls B410 of the motherboard housing or the motherboard housing connecting plate B420, or can be connected with both the side walls B410 of the motherboard housing and the motherboard housing connecting plate B420.

In some embodiments, the elastic spacer A200 may be provided with a circuit board through hole A201; the flexible display apparatus may be provided with a flexible circuit board A101 connecting the motherboard A400 and the flexible display module A100, the flexible circuit board A101 is embedded in the circuit board through hole A201, and one end is connected to the flexible display module A100, and the other end is connected to the motherboard A400.

In some embodiments, referring to FIG. 22, the flexible display apparatus may also be provided with a bendable rear housing A600. The rear housing A600 is disposed on the side of the battery module A300 away from the elastic spacer A200. The rear housing A600 can be connected to one or more of the side baffle B100, the end cover B300 and the motherboard housing B400, for example, the rear housing A600 can be bonded to the ends of the side end baffles B100, the end cover B300 and the motherboard housing B400 away from the elastic spacer A200.

In one embodiment of the present disclosure, the rear housing A600 is used to cover the motherboard, which can be connected with the motherboard housing B400. In this way, the rear housing A600 can protect the motherboard, and the front housing units can provide protection for the battery module A300.

Fifth Embodiment

The fifth embodiment of the present disclosure provides a mobile terminal, where the mobile terminal includes: the flexible display apparatus described above.

Specifically, the flexible display apparatus described above serves as a display module and a battery module of a mobile terminal, the mobile terminal can be a mobile phone, a tablet computer, a smart watch, a smart bracelet, etc., through the bendability of the flexible display module and the battery module, the mobile terminal can have various usage states, so that the mobile terminal can be displayed in a large area and can be bent, thereby improving the portability and wearable performance of the mobile terminal, for example: when the mobile terminal is a mobile phone, in addition to the flat state of use, it can be curled to adapt to the curved surface of the wrist and arm of the human, and can form a wearable bracelet device, which is in line with ergonomic requirements, and the user can switch the usage status of the mobile phone according to the usage requirements. Other non-bendable components of the mobile terminal can be arranged inside the housing connected with the battery module, and the battery module can supply power to each component of the mobile terminal and the flexible display module. In an embodiment of the present disclosure, the middle of the left end of the battery module shown in FIG. 1 has a connecting end for connecting with other components (see FIG. 3). Characteristics and/or components of the varying embodiments (e.g., the first to fifth embodiments, for example) may be combined to the extent permitted assuming conflicts do not exist between the characteristics and/or components.

According to the contents described above, embodiments of the present disclosure provide a mobile terminal, applying the flexible display apparatus described above, the mobile terminal includes a battery module and a flexible display module that can be bent together, the mobile terminal can be displayed in a large area and can be bent, thereby improving the portability and wearable performance of the mobile terminal and providing a variety of optional use forms for mobile terminals to meet users' needs.

After considering the specification and practicing the disclosure herein, it will be easy for those skilled in the art to think of the other implementations of the disclosure. The present disclosure intends to cover any variants, usage, or changes of adaptation of the present disclosure. These variants, usage, or changes of adaptation follow the general principles of the present disclosure, and include common sense or common technical means in the technical field not disclosed by the disclosure. The specification and embodiments are only exemplary, and the true scope and spirit of the present disclosure are defined by the appended claims.

What is claimed is:

1. A battery module, comprising:
a plurality of energy storage cells disposed along a first direction;
a flexible connecting portion connected between adjacent ones of the energy storage cells for transmitting electric energy;
a plurality of support housings corresponding to the plurality of energy storage cells in a one-to-one correspondence, wherein a support housing is provided with an accommodation cavity that fits an energy storage cell, the support housing is provided with a first side and a second side which are opposite to each other, the first side of the support housing is provided with an opening, and a width of the support housing in the first direction is gradually decreased from the second side to the first side; and
a support spacer with preset flexibility, wherein the plurality of support housings are disposed on one side of the support spacer along the first direction, and connecting members with preset flexibility are connected between adjacent supporting housings; the support housing comprises a bottom plate, a first side plate, a second side plate, a third side plate and a fourth side plate; the first side plate and the second side plate are oppositely disposed on two sides of the bottom plate, the third side plate and the fourth side plate are oppositely disposed on the other two sides of the bottom plate, the first side plate, the second side plate, the third side plate and the fourth side plate are enclosed to form the accommodation cavity and the opening opposite to the bottom plate; and the second side of the third side plate and the second side of the fourth side plate are detachably connected with a cover plate adapted to the opening;
a first end and a second end opposite to each other in the first direction, wherein a case is connected to a free end of the support housing at the first end opposite to an adjacent support housing, and an inside of the case is provided with an accommodating space; and
traction sheets configured to pass through the third side plates and the fourth side plates of the plurality of supporting housings from the first end to the second end of the battery module sequentially and respectively, wherein:
a second end of the traction sheets is fixed and is fixedly connected with the supporting housing located at the second end of the battery module, a first end of the traction sheets is configured to penetrate through a first side wall of the case and is connected with a limit end; and
the limit end is magnetic, and the first side wall of the case and a second side wall of the case opposite to the first side wall are respectively provided with a metal limit piece corresponding to the limit end.

2. The battery module according to claim 1, wherein:
an outside of the battery module is provided with a flexible wrapping layer; or
fillers with preset elasticity and flexibility are filled in gaps between adjacent support housings.

3. A flexible display apparatus, comprising:
a battery module according to claim 1;
a flexible display module, wherein the flexible display module is attached to a surface of the battery module on a second side for at least supplying power to the flexible display module;
a bending direction of the flexible display module is a first direction.

4. A flexible display apparatus, comprising:
a flexible display module, an elastic spacer, and a battery module that are sequentially stacked, the battery module comprising a flexible composite layer connected to the elastic spacer and a plurality of energy storage cells connected to a side of the flexible composite layer away from the elastic spacer; and
a front housing, comprising a plurality of side baffles;
wherein the energy storage cells are arranged in sequence along a first direction, and there is a gap between two adjacent energy storage cells; the plurality of energy storage cells are configured to supply power to the flexible display module through the flexible composite layer;
the side baffles are disposed on both ends of the energy storage cells and fixed at the elastic spacer; an orthographic projection of a side baffle on a plane perpendicular to a length direction of the energy storage cells is a trapezoid; a size of an end of the side baffle close to the flexible display module in the first direction is larger than a size of an end of the side baffle close to the energy storage cell in the first direction;
two adjacent side baffles are hinged with each other;
two ends of a side baffle along the first direction are respectively provided with an inside notch and an outside notch; at a position where the inside notch is provided, the side baffle is provided with an outer side wall;
at a position where the outside notch is provided, the side baffle is provided with an inner side wall;
the inner side wall is provided with a first hinge hole, and the outer side wall is provided with a second hinge hole;
in the two adjacent side baffles, a portion of the inner side wall of one first side baffle is configured to extend into the inside notch of the other side baffle to align one first hinge hole and one second hinge hole; and
the front housing further comprises a pin inserted into the aligned first hinge hole and the second hinge hole to hinge the two adjacent side baffles.

5. The flexible display apparatus according to claim 4, wherein:
a gap exists between two adjacent side baffles when the flexible display apparatus is in a flattened state; or
the front housing further comprises end covers which are disposed at two ends of the front housing and are connected with the elastic spacer; an end cover comprises two end cover baffles disposed opposite to each other, and an end cover connecting plate connecting the two end cover baffles; an accommodating space is formed between the two end cover baffles disposed opposite to each other, and the energy storage cell located at an end of the flexible display apparatus is accommodated in the accommodating space; and a gap exists between an end cover baffle and an adjacent side baffle when the flexible display apparatus is in a flattened state.

6. The flexible display apparatus according to claim 4, further comprising a motherboard, wherein the front housing further comprises a motherboard housing; and the motherboard housing is configured to fix the motherboard;

wherein the motherboard housing is connected with the elastic spacer and a gap exists between the motherboard housing and an adjacent side baffle when the flexible display apparatus is in a flattened state.

7. The flexible display apparatus according to claim 4, wherein:

the front housing further comprises a damping ring; one end of the pin is provided with an external thread;

one of the first hinge hole and the second hinge hole is provided with an internal thread, and the damping ring is disposed in the other one of the first hinge hole and the second hinge hole; and the pin is passed through and disposed in the damping ring, and is connected by the external thread and the internal thread.

8. The flexible display apparatus according to claim 4, wherein:

on an outer side of the inner side wall or an inner side of the outer side wall, the side baffle is provided with a damping layer; when the two adjacent side baffles are rotated relative to each other, the damping layer is capable of exerting a damping effect on a rotation between the inner side wall and the outer side wall cooperated with each other; and a thickness of a portion of the damping layer close to an edge of the side baffle is gradually decreased along the direction close to the edge of the side baffle.

9. The flexible display apparatus according to claim 4, wherein:

the front housing further comprises a baffle connecting plate; and the two side baffles located at both ends of the energy storage cell are connected by the baffle connecting plate, and the baffle connecting plate is located at a side of the energy storage cell away from the elastic spacer; or the front housing further comprises an end cover located at an end of the flexible display apparatus, and the end cover is hinged with an adjacent side baffle; the end cover comprises two end cover baffles disposed opposite to each other, and an end cover connecting plate connecting the two end cover baffles; and an accommodating space is formed between the two end cover baffles and the end cover connecting plate, the energy storage cell located at the end of the flexible display apparatus is accommodated in the accommodating space.

10. The flexible display apparatus according to claim 4, further comprising a motherboard, wherein the front housing further comprises a motherboard housing; and the motherboard housing is configured to fix the motherboard;

wherein the motherboard housing is connected with the elastic spacer, and the motherboard housing is hinged with adjacent side baffles.

11. The flexible display apparatus according to claim 4, wherein:

the side baffle is provided with a lightening hole; or an end of the side baffle close to the flexible display module is provided with a first bearing surface, and the first bearing surface is configured to carry and fix the elastic spacer.

12. The flexible display apparatus according to claim 4, further comprising a flexible light-transmitting cover plate, the flexible light-transmitting cover plate is disposed at a side of the flexible display module away from the elastic spacer; and the side baffle is further provided with a second bearing surface, the second bearing surface is located at a side of the first bearing surface away from the elastic spacer; wherein the second bearing surface is configured to carry and fix the flexible light-transmitting cover plate.

13. The flexible display apparatus according to claim 4, further comprising a motherboard and a front housing;

wherein the front housing comprises a first region, a second region and a third region, arranged in sequence along the first direction, the energy storage cells are disposed in the first region and the third region, and the motherboard is disposed in the second region.

14. A mobile terminal, comprising:

a flexible display apparatus, comprising:

a flexible display module, an elastic spacer, and a battery module that are sequentially stacked, the battery module comprising a flexible composite layer connected to the elastic spacer and a plurality of energy storage cells connected to a side of the flexible composite layer away from the elastic spacer, and a front housing, comprising a plurality of side baffles; wherein:

the energy storage cells are arranged in sequence along a first direction, and a gap exists between two adjacent energy storage cells;

the plurality of energy storage cells are configured to supply power to the flexible display module through the flexible composite layer;

the side baffles are disposed on both ends of the energy storage cells and fixed at the elastic spacer; an orthographic projection of a side baffle on a plane perpendicular to a length direction of the energy storage cells is a trapezoid; a size of an end of the side baffle close to the flexible display module in the first direction is larger than a size of an end close to the energy storage cell in the first direction;

two adjacent side baffles are hinged with each other;

two ends of a side baffle along the first direction are respectively provided with an inside notch and an outside notch; at a position where the inside notch is provided, the side baffle is provided with an outer side wall;

at a position where the outside notch is provided, the side baffle is provided with an inner side wall;

the inner side wall is provided with a first hinge hole, and the outer side wall is provided with a second hinge hole;

in the two adjacent side baffles, a portion of the inner side wall of one first side baffle is configured to extend into the inside notch of the other side baffle to align one first hinge hole and one second hinge hole; and the front housing further comprises a pin which is inserted into the aligned first hinge hole and the second hinge hole to hinge the two adjacent side baffles.

* * * * *